(12) United States Patent
Mousset

(10) Patent No.: US 11,606,433 B2
(45) Date of Patent: Mar. 14, 2023

(54) DEVICE FOR PROCESSING DATA OF ROLLING STOCK

(71) Applicant: RAILNOVA SA, Saint-Gilles (BE)

(72) Inventor: Charles-Henri Mousset, Watermael Boitsfort (BE)

(73) Assignee: RAILNOVA SA, Saint-Gilles (BE)

( * ) Notice: Subject to any disclaimer, the term of this patent is extended or adjusted under 35 U.S.C. 154(b) by 0 days.

(21) Appl. No.: 16/765,292

(22) PCT Filed: Mar. 12, 2019

(86) PCT No.: PCT/EP2019/056113
§ 371 (c)(1),
(2) Date: May 19, 2020

(87) PCT Pub. No.: WO2019/175144
PCT Pub. Date: Sep. 19, 2019

(65) Prior Publication Data
US 2020/0287971 A1    Sep. 10, 2020

(30) Foreign Application Priority Data

Mar. 12, 2018   (EP) .................................... 18161338

(51) Int. Cl.
*H04L 67/12*    (2022.01)
*B61L 15/00*    (2006.01)
(Continued)

(52) U.S. Cl.
CPC .......... *H04L 67/12* (2013.01); *B61L 15/0027* (2013.01); *B61L 15/0036* (2013.01);
(Continued)

(58) Field of Classification Search
None
See application file for complete search history.

(56) References Cited

U.S. PATENT DOCUMENTS 6,041,295 A * 3/2000 Hinderks ............... H04B 1/665
                                                         704/206
9,718,564 B1   8/2017 Beckman et al.
(Continued)

FOREIGN PATENT DOCUMENTS

CN   101789557 A *  7/2010
CN   101789557 A    7/2010
(Continued)

OTHER PUBLICATIONS

Gong et al. English Translation of CN-101789557-A. (Year: 2010).*
(Continued)

*Primary Examiner* — Noel R Beharry
*Assistant Examiner* — Rodrick Mak
(74) *Attorney, Agent, or Firm* — Workman Nydegger

(57) ABSTRACT

A device configured to process data comprised in data messages passing on message buses of a rolling stock comprises: a universal input interface receiving data messages complying with the three following physical layers: RS232; RS485; CAN. From the message buses, the data messages comprise data; a processing engine receiving a remote requested configuration comprising one or more processing rules; a standardizing unit decoding the data messages into standardized data streams in function of the remote requested configuration; and wherein the processing engine further applies one or more of the one or more processing rules of the standardized data streams in function of the remote requested configuration.

18 Claims, 7 Drawing Sheets

(51) Int. Cl.
   *B61L 25/02*      (2006.01)
   *H04L 12/40*      (2006.01)
   *B61L 27/40*      (2022.01)
   *B61L 27/57*      (2022.01)
   *B61L 27/70*      (2022.01)

(52) U.S. Cl.
   CPC .............. *B61L 25/025* (2013.01); *B61L 27/40* (2022.01); *B61L 27/57* (2022.01); *B61L 27/70* (2022.01); *H04L 12/40* (2013.01); *B61L 2205/02* (2013.01); *H04L 2012/40293* (2013.01)

(56) References Cited

U.S. PATENT DOCUMENTS

| | | | |
|---|---|---|---|
| 10,750,336 B2* | 8/2020 | Mendes | H04L 12/40 |
| 10,819,792 B2 | 10/2020 | Renac et al. | |
| 2002/0019891 A1* | 2/2002 | Morrow | G06F 13/387 |
| | | | 710/8 |
| 2002/0110146 A1* | 8/2002 | Thayer | H04L 12/4604 |
| | | | 370/465 |
| 2002/0113686 A1* | 8/2002 | Shannon Carravallah | |
| | | | G08C 19/28 |
| | | | 340/5.61 |
| 2003/0084277 A1* | 5/2003 | Przywara | G10L 19/00 |
| | | | 713/1 |
| 2004/0138790 A1* | 7/2004 | Kapolka | G06Q 10/08 |
| | | | 701/29.3 |
| 2005/0065678 A1* | 3/2005 | Smith | G06Q 10/00 |
| | | | 701/31.4 |
| 2010/0004805 A1 | 1/2010 | Denis et al. | |
| 2011/0046775 A1* | 2/2011 | Bailey | B07C 3/02 |
| | | | 700/224 |
| 2013/0304411 A1* | 11/2013 | Berndt | G01F 25/10 |
| | | | 702/116 |
| 2015/0244806 A1 | 8/2015 | Renac et al. | |
| 2015/0336594 A1* | 11/2015 | Yoon | B61L 27/0094 |
| | | | 455/66.1 |
| 2016/0048712 A1* | 2/2016 | Butler | H01Q 1/38 |
| | | | 340/10.51 |
| 2016/0163514 A1* | 6/2016 | Fisk, II | H01J 37/32174 |
| | | | 315/111.21 |
| 2016/0321421 A1* | 11/2016 | Delgrande | H04L 41/08 |
| 2016/0359741 A1 | 12/2016 | Cooper et al. | |
| 2017/0285623 A1* | 10/2017 | Figoli | G05B 19/0421 |

FOREIGN PATENT DOCUMENTS

| | | | | |
|---|---|---|---|---|
| CN | 104520829 A | | 4/2015 | |
| CN | 105515924 A | | 4/2016 | |
| CN | 206003088 U | * | 3/2017 | |
| EP | 2133256 A1 | | 12/2009 | |
| EP | 3246778 A1 | | 11/2017 | |
| EP | 3359351 B1 | * | 8/2021 | ............ B23Q 17/00 |
| WO | 2005067142 A1 | | 7/2005 | |
| WO | WO-2009127137 A1 | * | 10/2009 | ............ H04L 67/12 |
| WO | 2015088887 A1 | | 6/2015 | |

OTHER PUBLICATIONS

International Search Report & Written Opinion from PCT Application No. PCT/EP2019/056113, dated Apr. 5, 2019.
Extended European Search Report from corresponding EP Application No. EP 18161338.1, dated Sep. 13, 2018.
Office Action from corresponding RU Application No. 202090643/31, dated Oct. 9, 2020.
"The UART to CAN Bus Converter" (I-7530, I-7530T, I-7530-FT, I-7530A, I-7565, IM-7530), User's Manual, Version 1.3, Apr. 30, 2015, 68 pages.
Office Action from corresponding EP Application No. 18161338, dated Jul. 1, 2020.
"Brochure: Electrics for Rolling Stock," Schaltbau, Aug. 31, 2017, 16 Pages.
"I-7188XBD-CAN/µPAC-7186EXD-CAN; User Manual," ICP DAS, May 9, 2014, pp. 1-58.
Office Action from corresponding Chinese Application No. 201880051239.8, dated May 14, 2021.
Office Action from corresponding Russian Application No. 202090643, dated Jun. 23, 2021.
Office Action from corresponding Chinese Application No. 2019800053654, dated Nov. 20, 2020.

* cited by examiner

DEVICE FOR PROCESSING DATA OF ROLLING STOCK

FIELD OF THE INVENTION

The present invention generally relates to remote and fail-safe analysis of data messages passing on message buses of rolling stock.

BACKGROUND OF THE INVENTION

Rail plays an important role in creating a sustainable future for transport around the world. Rail transport may help tackle climate change, fight road congestion, create economic growth for a country, contribute to the (re)-industrialisation of this country, and provide mobility to citizens. Rolling stock is an essential item within the railway and transport systems, but it is also one of the most complex. The term rolling stock refers to any vehicle that moves on a railway. It usually comprises both powered and unpowered vehicles, for example locomotives, railroad cars and vehicles, coaches, trains and wagons. From running gear through strength and durability, drives, brakes, regulation and control systems and up to fire protection and occupational health and safety, all safety-relevant functionalities of rolling stock must be in full working order at all times.

Nowadays, the monitoring of the performance of railway assets and devices of rolling stock is planned regularly by maintenance teams to detect and/or foresee a possible malfunction and/or a failure of each railway asset and/or device on board the rolling stock. For example, EP2133256A1 discloses a computerized-on-board system for controlling a train or rail vehicle in order to allow a better arrangement of the cabin for the provision of the data from various items of equipment of the train or rail vehicle. Typically, each fault, breakdown or failure of each railway asset or device is individually and independently detected for example by retrieving the information manually or via software on a laptop from a handler of rolling stock on board the rolling stock, by human expert inspection directly on the train. Each time a failure or a series of failures is identified, the rolling stock is brought to a workshop for in depth inspection and diagnostic and repair. Monitoring and/or diagnosing the performance of on board railway assets and devices of rolling stock therefore requires temporary but repetitive immobilization throughout the year of the rolling stock. Bringing the rolling stock in for diagnosis and repair increases the downtime of the rolling stock, which is very inconvenient, inefficient and ineffective in the context of the management of a railway fleet and railway operation.

Another concern in railway fleet management is that operators and maintainers face huge data complexity: each locomotive or railroad car or railway vehicle or passenger train comprises a different set of on board devices which can be each compatible with different message bus communication protocols developed for railway fleet, for example with a Multifunction Vehicle Bus also referred to as MVB, or a Factory Instrumentation Protocol also referred to as FIP, or a Profibus, or a Controller Area Network also referred to as CAN. Additionally, the set of on board devices varies from one locomotive or railroad car to another. Devices within the same locomotive or the same railroad car or the same railroad car therefore comprise different input and/or output interfaces to communicate with the message buses and/or to communicate with other devices. For example, several devices may receive and/or generate data messages passing on message buses using RS232 physical layer, while other devices may receive and/or generate data messages passing on message buses using CAN physical layer. Many plug connectors and/or interface cards and/or extension cards are required in rolling stock to allow a communication amongst the devices themselves and to allow communication of the devices from and/or to the different message buses in the rolling stock in order to monitor a condition of the rolling stock and a condition of onboard devices which comprise signals using different physical layers. The plug connectors and/or the interface cards and/or the extension cards are hardware extensions which comprise interface convertors configured to for example convert data signals using a first physical layer into data signals using another physical layer different from the first physical layer. Interfaces cards can convert data signals using for example RS232 physical layer into data signals using for example RS485 physical layer. Monitoring systems for railway fleet management must then comprise a plurality of plug connectors and of interface or extension cards, making them complex to manufacture and to implement in rolling stock. Alternatively, a plurality of interfaces can be configured for a single device using hardware jumpers. For example, a serial interface can be provided either of type RS232 or of type RS485. Hardware jumpers are small jumpers which are plugged as short-circuit connectors on pins of contacts. In this case, when a jumper is plugged on pins, these pins are electrically connected to each other. Hardware jumpers can also be 0 Ohm resistors or dual inline switches. An interface may be provided of the RS232 type and may be switched back and forth to a RS485 type thanks to the hardware jumpers. However, the presence of hardware jumpers must be taken into account during the production process of the devices and they must be placed in a mounting process corresponding to the required interfaces. The addition or the removal of one or more devices and/or message buses in rolling stock might change the required interfaces for each device. Hardware jumpers can then only be modified on board by opening each device, thereby making their use lack flexibility. Each change is time-consuming, susceptible to errors and opening the devices can also lead to the expiry of their warranty.

Several challenges therefore remain today in accessing data from rolling stock. Operators and maintainers rely on a plurality of diagnostic PCs and on the availability of experts to perform maintenance on the rolling stock. Each diagnostic PC comprises expertise knowledge and is configured to monitor and diagnose a certain type of device on board the locomotive or railroad car. Due to the use of different physical layers by the devices, a diagnostic PC might require the use of a plurality of plug connectors and/or of interface or extension cards to be able to communicate with a plurality on board devices, for example three, four, five different extension cards or even more. This increases the complexity of accessing data from devices on board rolling stock. Additionally, the use of diagnostic PC results in the creation of local, unsecure and incomplete databases on each diagnostic PC which need to be manually exported afterwards by the operators and the maintainers, for example via USB sticks, etc. Detailed and reliable knowledge on the state of the locomotive or railroad car is therefore in first instance not widespread and cannot be shared. Accessing data from rolling stock is therefore not actionable, is time-consuming because of the use of a plurality of PCs and USB sticks, and usually happens too late. Indeed, an intervention of an expert to diagnose the cause of a failure of a device is planned after the failure has already happened. This is incompatible with the implementation of a real-time support for the driver of the locomotive or railroad car and predictive maintenance, which aims at anticipating failures before they happen.

Accessing data from rolling stock nowadays further raises safety concerns. The entire system comprising the rolling stock must fulfil safety requirements according to both national and international standards and directives. The diagnostic PCs and the USB sticks used by operators and maintainers form an intrusion in the rolling stock system and threaten the integrity of the safety of the rolling stock. Indeed, running software developed to test and diagnose original equipment in rolling stock can reset configurations of the message bus to which the equipment is coupled. There exists a risk that accessing data from rolling stock while in operation therefore jeopardizes the safety of the locomotive or the railroad car.

An additional remaining challenge when monitoring performance of railway assets and devices of rolling stock is the current paradigm when it comes to collecting data from rolling stock. Data from railway assets and devices on board rolling stock is usually preferably collected on remote servers, and the data is for example sent from the rolling stock to and stored in the cloud. This usually requires downsampling of data at 10 seconds to 1 minute to reduce the data rate and/or the size of the data due to data transmission cost and storage costs. It is then not possible to accurately detect transitional regimes from the data, such as for example current peaks. Intermittent or irregular connections between rolling stock and the remote servers as well as latency might also jeopardize the accuracy and the relevancy of the collected data in the context of a real-time diagnostic of the condition of the rolling stock. The sheer amount of data generated could easily exceed available bandwidth or be too cost prohibitive to send to the cloud. In addition, by the time data is uploaded to the cloud, processed in the data center, and the results transferred back to the edge, it may be too late to take any action. Additionally, when collecting data from rolling stock on one or more remote servers, several seconds of latency might be necessary to process the data on the server. Obstacles such as network throughput, communication costs, available server capacity to treat the data and associated processing costs form further limitations to this paradigm.

It is an objective of the present invention to disclose a device that overcomes the above identified shortcomings of existing solutions. More particularly, it is an objective to disclose a device for processing data comprised in data messages passing on message buses of rolling stock that allows to centrally and safely gather data from rolling stock in a flexible manner, thereby minimizing the downtime of rolling stock and the monitoring effort.

SUMMARY OF THE INVENTION

According to a first aspect of the present invention, the above defined objectives are realized by a device for processing data comprised in data messages passing on message buses of a rolling stock, the device comprising:
- a universal input interface, configured to receive data messages complying with the three following physical layers:
  RS232;
  RS485;
  CAN;
  from the message buses, the data messages comprising data;
- a processing engine, configured to receive a remote requested configuration comprising one or more processing rules;
- a standardizing unit, configured to decode in function of the remote requested configuration the data messages into standardized data streams comprising the data; and
wherein the processing engine is further configured to receive the standardized data streams from the standardizing unit, and wherein the processing engine is further configured to process the data by applying one or more of the one or more processing rules on the data of the standardized data streams in function of the remote requested configuration.

The device according to the present invention comprises a universal input interface. The device is configured to process data of a rolling stock from data messages passing on message buses using RS232 physical layer and on message buses using RS485 physical layer and on message buses using CAN physical layer. In other words, the device according to the present invention comprises a single universal input interface, on which data messages from different buses using different physical layers and/or different protocols can be received. Devices within the same locomotive or the same railroad car or vehicle or passenger train, which comprise different input and/or output interfaces which can be incompatible with each other, are all able to communicate with the device according to the present invention through the single universal input interface of the device according to the present invention. The device according to the present invention therefore offers a unified platform to which a majority and preferably all of the on board devices of the rolling stock may be coupled without the need to interpose for example extension cards or plug connectors between an on board device and the device according to the present invention. The device according to the present invention converts all the data messages received at the universal input interface into standardized data streams independently from the physical layer used by the message bus on which the data messages pass. When using the device according to the present invention, monitoring systems for railway fleet management must not comprise a plurality of plug connectors and of interface or extension cards anymore, thereby rendering their implementation in rolling stock simple and easy. The device according to the present invention therefore becomes one centralized platform from which all the assets and components and devices coupled to one or more message buses can be checked and characterized.

Thanks to the device according to the present invention, the processing of data comprised in data messages passing on message buses of the rolling stock and of devices aboard the rolling stock, for example on board a locomotive and/or railroad cars or passenger vehicle, is performed continuously over time and can therefore be used to support for example a driver of a locomotive in real-time or a remote central hotline. This way, an accurate evaluation of the state or condition of the rolling stock and of the devices on board the rolling stock can be characterized from data messages passing on message buses by the device according to the present invention, and transient events and transitional regimes occurring on board the rolling stock can be detected by the device according to the present invention in real-time without down sampling of the data. The use of the device according to the present invention can therefore support an operator and/or a technician foresee a shortage or failure of one or more of the devices on board the rolling stock and/or can support the operator and/or the technician diagnose the shortage or failure. This way, the use of the device according to the present invention supports an operator and/or a technician continuously over time in the maintenance of the rolling stock without requiring a repetitive immobilization or downtime of the rolling stock throughout its lifetime. Accessing data from rolling stock in real-time allows a timely reaction to problems to be tackled in the rolling stock. Indeed, an operator and/or a technician can be alerted in real-time of failures in one or more on board devices of the rolling stock and/or in the rolling stock, and/or can be alerted in real-time of upcoming failures in one or more devices of the rolling stock and/or in the rolling stock. This is compatible with the implementation of a real-time support for the driver of the locomotive or railroad car or passenger vehicle.

The device according to the present invention processes data from a plurality of devices on board rolling stock in a centralized manner. The data messages passing on the message buses comprise information indicative for a status of one or more of the devices coupled to the message buses. The device according to the present invention is configured to transmit and receive data messages to/from on board devices and/or to process data of on board devices by listening in on or receiving the data messages passing on message buses coupled to on board devices. In other words, the device according to the present invention is configured to analyze and/or monitor from the data messages the state and/or the performance of a plurality of on board devices and on board systems. Furthermore, the device according to the present invention is configured to determine failures in the devices and the systems aboard the rolling stock when the state of the rolling stock does not comply with one or more processing rules after analysis of the data of the data messages. One device according to the present invention performs a centralized monitoring of a plurality of on board assets. Operators and maintainers therefore do not need to rely on a plurality of diagnostic PCs and/or on the availability of experts to perform maintenance on the rolling stock. This removes the complexity of accessing data from devices on board rolling stock. Additionally, the device according to the present invention creates a local and complete database of data messages and standardized streams which can be securely, individually or as a whole exported to remote systems, for example to remote systems used by the operators and the maintainers of the rolling stock. Alternatively, the created database can be accessed by remote systems, for example by remote systems used by the operators and the maintainers of the rolling stock. Detailed and reliable knowledge on the state of the locomotive or railroad car is therefore widespread and can be shared easily from a centralized database comprised in the device according to the present invention. This uniformed platform allows the centralization of the history of the monitoring and the diagnostic of the rolling stock, for example in the cloud, and renders accessing data from rolling stock widely accessible to operational staff and experts who can leverage themselves with data analysis software. Accessing data from rolling stock is therefore actionable. Indeed, it becomes possible with the device according to the present invention to access live data about the rolling stock, for example online, to dispatch maintenance work order in one click, to follow up on mobile team interventions and to extend predictive maintenance periodicities.

Additionally, the device according to the present invention performs a fail-safe remote monitoring of a plurality of on board devices and system, for example of hundreds of devices or thousands of devices or systems for example simultaneously. It is therefore not necessary for an operator and/or a technician of the rolling stock to physically and individually access and open each on board device and system aboard the rolling stock to perform the analysis of its performance and/or to troubleshoot it. This guarantees the warranty of all the on board devices remains valid and considerably reduces the downtime of the rolling stock. Furthermore, the device according to the present invention is added to the rolling stock after the production process of the rolling stock, and the device according to the present invention is simply plugged on one or more message buses on board the rolling stock, thereby making its installation easy in the rolling stock. The implementation of the device according to the present invention is non-intrusive to the rolling stock, and particularly non-intrusive to the messages buses. The device according to the present invention performs a fail-safe and totally passive analysis of the data of the rolling stock from the data messages passing on the message buses while complying with safety requirements according to both national and international standards and directives. No more diagnostic PCs or USB sticks used by operators and maintainers are necessary to access the data from on board device, and the device according to the present invention does not form an intrusion in the rolling stock system or threaten the integrity of the safety of the rolling stock. Indeed, running software developed to test and diagnose original equipment in rolling stock in the device according to the present invention does not reset configurations of the message buses to which the device according to the present invention is coupled. Additionally, if a reconfiguration of the device according to the present invention is required after the addition and/or the removal of on board devices in the rolling stock, the device according to the present invention may be remotely reconfigured without needing a manual intervention on the device or on the on board devices. This lowers the occurrence of errors when manually intervening on the on board devices which might lead to an immobilization of the rolling stock, and this further ensures that the remote configuration of the device according to the present invention remains flexible.

The device according to the present invention demonstrates Edge Computing capability. Edge computing means that the computing of the data is done on the device inside the rolling stock instead of on a remote server. The main advantage of this is that the device according to the present invention can make lossless data computation on real time data of the data messages at milli-second frequency. For example, the device according to the present invention will be able to observe a transient abnormal current during 10 milliseconds on the traction motor or door motor, while this would be impossible when relying on processing on a remote server. For example, hundreds of Gigabit per month would be required to store an entire rolling stock bus data on a server, which would create high data transmission costs per train per month for example SIM card, which is not deemed economical. In contrast, an edge computing can do all the processing locally and only send abnormal alerts. This architecture allows to decode and expose high throughput message busses according to the present invention to a highly configurable rule engine, enabling calculation at every millisecond or higher frequency, which is particularly relevant for predictive maintenance purposes. Most existing Edge Computing solutions allow saving data into a local storage repository, and they optionally offer the possibility to publish the unprocessed data to a cloud environment for offline analysis of the data. In other words, most existing Edge Computing solutions provide a "store-and-forward" or some form of basic filtering capabilities. On the other hand, the device according to the present invention provides a highly scalable and efficient edge analytics platform which enables real-time, on-site stream processing of data comprised in data messages passing on message buses from rolling stock. The device according to the present invention provides a complete Edge Computing solution comprising a miniaturized Complex Event Processing engine, also referred to as CEP engine, also known as an analytics engine to help derive real-time insights right at the edge with for example the use of machine learning models. It is then possible to define failure conditions and to detect interesting complex events on the multitude incoming data of the rolling stock. Processing the data of the rolling stock with the device according to the present invention directly prevents costly machine failures or downtime. The data can also be fed into appropriate algorithms, such as for example machine learning algorithms, to enhance detection and prediction of anomalies or failure conditions of the rolling stock. The device according to the present invention improves the overall efficiency and safety of rolling stock in real time.

The term rolling stock refers to any vehicle that moves on a railway network. It usually comprises both powered and unpowered vehicles, for example one or more locomotives, and/or one or more railroad cars, and/or one or more railway vehicles, and/or one or more passenger trains, and/or one or more coaches, and/or one or more wagons. In other words, rolling stock comprises engines and carriages that are used on a railway. In other words, rolling stock comprises one or more wheeled or magnetic levitation or hyperloop kind of vehicles used on a railway, for example one or more locomotives and/or one or more passenger coaches and/or one or more freight wagons and/or one or more guard's vans, etc.

On board devices, also referred to as devices aboard rolling stock, may for example be temperature sensors, pressure sensors, brakes, doors, fire detectors, motors, air conditioning systems, heating systems, traction motors, power converters, batteries, pantographs, diesel engines, cooling system, navigation systems, etc. The device according to the present invention is coupled to these devices and/or railway assets and/or components via one or more message buses on which one or more data messages pass. The data messages are generated by on board devices and/or on board systems and/or by the device according to the present invention, thereby allowing a communication between on board devices and the device according to the present invention. Each data message comprises data which comprises bits and/or bytes and/or data strings. The bits and/or bytes and/or data strings comprise information indicative for the functioning of the respective device aboard the rolling stock and/or the rolling stock itself. The device according to the present invention is therefore configured to transmit and receive data messages to/from on board devices and/or to analyze the collected data by listening in on the data messages passing on message buses coupled to on board devices. For example the device according to the present invention is configured to read and/or analyze data from a battery system of a locomotive, and/or of the bearing system of a locomotive or a railway car, and/or the Train Control & Management System of a train, also referred to as TCMS, and/or the engine remote diagnostic system of a locomotive, and/or the energy remote monitoring system of a train, etc. The standardizing unit of the device according to the present invention decodes the data messages received by the universal input interface into standardized data streams in function of a remote requested configuration. The processing engine of the device according to the present invention monitors the state the rolling stock from the standardized data streams in function of the remote requested configuration comprising one or more processing rules. The processing engine diagnoses the condition of the rolling stock when one or more of the processing rules are not satisfied by the condition of the rolling stock.

By processing data comprised in data messages according to the present invention is understood that the processing engine reads and/or analyses the data messages passing on message buses in function of the requested configuration by analyzing corresponding standardized data streams and therefrom collecting and/or determining parameters for example indicative of and characterizing a physical and technical and electrical state of one or more respective devices on board the rolling stock. The processing engine is configured to evaluate at a given time instant according to one or more processing rules and/or over given period of times according to one or more processing rules a state of the rolling stock by for example collecting data such as parameters of the rolling stock predefined in the processing rules of the remote requested configuration from received data messages and/or by determining data such as parameters of the rolling stock predefined in the processing rules of the remote requested configuration by computing the data comprised in the received data messages. In other words, the device according to the present invention is remotely configured to read data comprised in data messages passing on message buses of a rolling stock. The device may be further remotely configured to transmit the read data via for example a GSM module and/or an Ethernet port and/or a wireless transmitter. Alternatively, the device according to the present invention is remotely configured to analyze and/or handle and/or manage and/or treat and/or prepare data comprised in data messages passing on message buses of a rolling stock. The device may be further remotely configured to transmit the processed data via for example a GSM module and/or an Ethernet port and/or a wireless transmitter. The processing engine applies one or more processing rules to read and/or extract and/or compute from the data messages passing on the message buses data such as parameters and characteristics of the rolling stock, such as for example its real-time speed and its fuel or electrical energy consumption, the state charge of its batteries, etc. The identified parameters and characteristics form the condition of the rolling stock. The processing engine further executes processing rules to determine whether the identified data complies with the processing rules. For example, a processing rule may comprise a linear regression and the processing engine may for example receive standardized data streams comprising the voltage and current and temperature of the motor of the rolling stock. In accordance with a requested configuration, the processing engine executes the linear regression comprised in the processing rule on the voltage and current and temperature of the rolling stock to determine the state charge of the battery of the rolling stock. The condition of the rolling stock then comprises the state charge of the battery of the rolling stock. The processing engine then further executes a rule in function of the requested configuration to determine whether the state charge of the battery complies with the processing rule. For example, a processing rule comprises a minimum state charge threshold of the battery and a requirement to compare the determined state charge of the battery to the minimum state charge threshold of the battery and an indication that a state charge of the battery lower than the minimum state charge threshold of the battery does not comply with the manufacturer specifications. In the example, the diagnosing then compares the determined state charge of the battery to the minimum state charge threshold of the battery. When the data does not comply with one or more rules, i.e. in the example when the determined state charge of the battery is larger than the minimum state charge threshold of the battery, this is an indication for the device according to the present invention that the rolling stock demonstrates one or more failures/problems/forthcoming trouble that need to be tackled.

According to an optional aspect of the invention, the universal input interface comprises:
- at least one RS232 input module configured to receive data messages complying with RS232 physical layer, such as one or more data messages complying with serial interfaces;
- at least one RS485 input module configured to receive data messages complying with RS485 physical layer, such as one or more data messages complying with physical layers defined by one or more of the following: J1708, Multifunction Vehicle Bus, Profibus, Modbus, On-Board Diagnostic, a serial interface; and
- at least one CAN input module configured to receive data messages complying with CAN physical layer, such as one or more data messages complying with physical layers defined by one or more of the following: J1939, Controller Area Network.

According to an optional aspect of the invention, the universal input interface further comprises:
- at least one Ethernet input module configured to receive data messages complying with the PROFINET standard and/or one or more data messages complying with a Train Communication Network such as Ethernet Train Backbone; and
- at least one digital input module configured to receive digital data messages.

For example, a message bus is a fieldbus. More particularly, a message bus is for example a Multifunction Vehicle Bus or

| . . . a vehicle fieldbus using the following physical layer . . . | . . . and comprising the following protocol: |
|---|---|
| RS232 physical layer | Modbus |
| RS485 physical layer | Multifunction Vehicle Bus or MVB |
| RS485 physical layer | Factory Instrumentation Protocol or FIP or WorldFIP |
| RS485 physical layer | Profibus |
| RS485 physical layer | SAE J1708 |
| RS485 physical layer | Modbus |
| RS485 physical layer | Wire Train Bus or WTB |
| RS485 physical layer | LonWorks |
| CAN physical layer | SAE J1939 |
| CAN physical layer | Controller Area Network or CANopen |
| Ethernet | Profinet |
| Ethernet, powerline | LonWorks |
| Ethernet | Modbus |
| Ethernet | Ethernet Train Backbone or ETB |

Fieldbus is an industrial network system for real-time distributed control. Fieldbus couples a plurality of instruments, devices, components and systems on board a train. Fieldbus works on a network structure which typically allows daisy-chain, star, ring, branch, and tree network topologies. Previously, computers were connected using serial connections, for example RS232, by which only two devices could communicate. Fieldbus requires only one communication point at the controller level and allows a plurality of analog and digital points on board a train or rolling stock to be connected at the same time. This reduces both the length of the cable required and the number of cables required. There existed initially an initial form of the IEC 61158 standard for Fieldbus with eight different protocol sets called "Types", but then the fieldbus types were reorganized into Communication Profile Families, also referred to as CPFs, for example Profibus.

The Train Communication Network, also referred to as TCN, is a hierarchical combination of two fieldbus for data transmission within trains. It comprises the Multifunction Vehicle Bus, also referred to as MVB, inside each vehicle and the Wire Train Bus, also referred to as WTB, to connect different railway cars.

The wire train bus or WTB has been designed for international passenger trains with variable composition. The medium comprises a duplicated shielded twisted pair cable, which runs in the UIC cables between the vehicles. The connector between the vehicles is the 18-pole UIC connector. The standard connector for the WTB nodes is a DIN 9 pin connector. The physical level uses RS485 levels at 1 Mbit/s data rate. The encoding uses a Manchester II code and a HDLC frame protocol with proper voltage balancing to avoid DC components in the galvanic isolation transformers. The Manchester decoder uses a phase/quadrature demodulation, except for RS485 that operates with zero-crossings, which allows to span 750 m under worst-case conditions, especially when only the two extremity vehicles are equipped, as is the case with multiple traction for freight trains. A unique property of the WTB is the train inauguration in which the newly connected vehicles receive an address in sequence and can identify the vehicle side (called port and starboard like in the marine) so that doors open on the correct side. Up to 32 addresses can be dynamically allocated. When two train compositions join, the addresses are reallocated to form a new composition of vehicles with a sequential address. Vehicles without WTB node are not counted. The frames have a maximum payload of 1024 bits. The WTB operates cyclically to provide deterministic operation, with a period of 25 ms, used mainly for the traction control. The WTB also supports sporadic data transmission for diagnostics. The content of the periodic and sporadic frames is governed by the UIC 556 standard. Since frame size is limited, a version of TCP with reduced overhead was used for message segmenting and reassembly, that at the same time allows to cope with changes in composition, called Real-Time Protocol or RTP.

The MVB connects individual nodes within a vehicle or in a closed train set. When the fieldbus is a Multifunction Vehicle Bus, the cable assembly is available in three standards: Electrical Medium Distances, also referred to as EMD, which uses shielded twisted pair with RS485 transmitters and transformers for galvanic isolation and for a length of the cable assembly up until a few hundred meters, Electrical Short Distances, also referred to as ESD, which uses a simple backplane wiring without galvanic isolation and for a length of the cable assembly up until a few tens meters, and lastly optical lines for very long communication distances and galvanic insulation. The MVB operates with 1.5 Mbps via twisted wire pairs and via optical fibers. It is structured with two channels to guarantee a higher reliability of transmission. These two channels are separated in passages from one vehicle to another. The transmission of the data messages on the MVB is controlled by several bus managers or only by one bus manager. With this, the data transfer is asynchronous. For the system, this means that each bus manager has its own clock. The MVB is based on the master-slave principle. The master can be coupled to the bus at any location.

The data messages pass periodically on the fieldbus and/or pass sporadically on the fieldbus. For example, the MVB principally transfers two types of data: process variables, i.e. periodic data, and messages, i.e. sporadic data. Process variables are short data, such as for example data messages comprising of 16, 32, 64, 128 or 256 bits, that provide information about the status of the train, for example its velocity. Alternatively, the data messages comprise 256 bits. The process variables are transported in cycles, so as to guarantee low latency, namely below for example 15 ms within a railway car, and below for example 100 ms within a train. Messages are longer information and enable analysis for example of the network management. The message payload can vary in range from a few bytes up to megabytes. The messages are sent according to demand, without time constraints. Periodic and sporadic data messages are passing on the same bus in the devices, but they are transmitted alternatively and never together. Process data messages are transmitted to all the devices on the bus. The master is responsible for polling regularly slave by sending a 'Master Frame'. The slaves monitor the bus, and when one slave gets a Master Frame requesting a parameter it owns, the slave sends back a message comprising the data requested.

The Factory Instrumentation Protocol or FIP is a standardized field bus protocol defined in the European Standard EN50170. A number of manufacturers from Japan and America merged with FIP to the WorldFIP standardization group. The closest cousin of the FIP family can be found today in the Wire Train Bus for train coaches. However, a specific subset of WorldFIP, known the FIPIO protocol, can be found widely in machine components.

A Controller Area Network bus, also referred to as CAN bus, is a robust vehicle bus standard designed to allow microcontrollers and devices to communicate with each other in applications without a host computer. It is a message-based protocol. As the CAN standard does not include tasks of application layer protocols, such as flow control, device addressing, and transportation of data blocks larger than one message, and above all, application data, many implementations of higher layer protocols were created. Among these implementations are CANopen—EN 50325-4. CANopen is a communication protocol and device profile specification for embedded systems used in automation. In terms of the OSI model, CANopen implements the layers above and including the network layer. The CANopen standard consists of an addressing scheme, several small communication protocols and an application layer defined by a device profile. The communication protocols have support for network management, device monitoring and communication between nodes, including a simple transport layer for message segmentation/desegmentation. The lower level protocol implementing the data link and physical layers is usually Controller Area Network, although devices using some other means of communication, such as for example Ethernet Powerlink, EtherCAT can also implement the CANopen device profile.

Local operating network, also referred to as LonWorks, is a networking platform specifically created to address the needs of control applications. The platform is built on a protocol created by Echelon Corporation for networking devices over media such as twisted pair, powerlines, fiber optics, and RF. Two physical-layer signaling technologies, twisted pair "free topology" and power line carrier, are typically included in each of the standards created around the LonWorks technology. The two-wire layer operates at 78 kbit/s using differential Manchester encoding, while the power line achieves either 5.4 or 3.6 kbit/s, depending on frequency. Additionally, the LonWorks platform uses an affiliated Internet protocol tunneling standard ISO/IEC 14908-4 in use by a number of manufacturers to connect the devices on previously deployed and new LonWorks platform-based networks to IP-aware applications or remote network-management tools. Many LonWorks platform-based control applications are being implemented with some sort of IP integration, either at the UI/application level or in the controls infrastructure. This is accomplished with Web services or IP-routing products available in the market.

SAE J1708 is a standard used for serial communications between Electronic Control Units on a heavy duty vehicle and also between a computer and the vehicle. With respect to Open System Interconnection model or OSI, J1708 defines the physical layer. Common higher layer protocols that operate on top of J1708 are SAE J1587 and SAE J1922. The standard defines a 2-wire 18 gauge wire cable that operates at 9600 bit/s. A message is composed of up to 21 characters, unless the engine is stopped and the vehicle is not moving in which case transmitters are allowed to exceed the 21 byte max message length. Messages start with a Message ID or MID character and finish with a checksum at the end. Characters are transmitted in the common 8N1 format. The hardware utilized are RS-485 transceivers wired for open collector operation through the use of a pullup and pulldown of the separate data lines. Transmission is accomplished by controlling the driver enable pin of the transceiver. This method allows multiple devices to share the bus without the need for a single master node. Collisions are avoided by monitoring the bus while transmitting the MID to ensure that another node has not simultaneously transmitted a MID with a higher priority.

SAE J1939 is the vehicle bus recommended practice used for communication and diagnostics among vehicle components. SAE J1939 is used in the commercial vehicle area for communication throughout the vehicle, with the physical layer defined in ISO 11898. SAE J1939 defines five layers in the seven-layer OSI network model, and this includes the Controller Area Network ISO 11898 specification using only the 29-bit/"extended" identifier for the physical and data-link layers. Under J1939/11 and J1939/15, the data rate is specified as 250 kbit/s, with J1939/14 specifying 500 kbit/s. All J1939 packets, except for the request packet, contain eight bytes of data and a standard header which contains an index called Parameter Group Number or PGN, which is embedded in the message's 29-bit identifier. A PGN identifies a message's function and associated data.

Modbus is a serial communications protocol which enables communication among many devices connected to the same network. Modbus is often used to connect a supervisory computer with a remote terminal unit in supervisory control and data acquisition systems. Each device intended to communicate using Modbus is given a unique address. In serial and MB+ networks, only the node assigned as the Master may initiate a command. On Ethernet, any device can send out a Modbus command, although usually only one master device does so. A Modbus command contains the Modbus address of the device it is intended for. Only the intended device will act on the command, even though other devices might receive it. All Modbus commands comprise checksum information, to allow the recipient to detect transmission errors.

The universal input interface is further configured to receive analogue data. The universal input interface for example further comprises an analogue data collecting unit which is configured to collect analogue data. For example, the analogue data collecting unit is configured to receive analogue data from the rolling stock and/or from assets and/or devices on board the rolling stock. Optionally, the device further comprises an internal data collecting unit configured to collect internal data from the device. For example, the internal data comprises a battery level of a battery of the device which is collected from the device by the internal data collecting unit, and/or the internal data comprises for example a temperature of the device and/or of the rolling stock and/or of a component on board, and/or the internal data comprises location information about the rolling stock, and/or the internal data comprises information generated by the GSM module and/or the wireless transmitter, for example cellular data from the GSM module, and/or the internal data comprises determined electrical parameters of the device, and/or the internal data comprise vibration data of the device, etc.

According to an optional aspect of the invention, the standardizing unit comprises a plurality of codecs configured to decode the data messages into the standardized data streams.

This way, the plurality of codecs decodes data messages received from message buses using RS232 physical layer and from message buses using RS485 physical layer and from message buses using CAN physical layer into standardized data streams comprising the data of the corresponding data messages received from the message buses. To each message bus using a particular physical layer is associated one codec configured to convert the corresponding data messages such that all the data messages received by the device are converted into a uniform format of standardized data streams comprising the data of the corresponding data messages received from the message buses. In other words, all the data messages received by the device are standardized in a uniformed format by converting them into standardized data streams comprising the data of the corresponding data messages received from the message buses.

According to an optional aspect of the invention, the device further comprises a remote configuration receiver, wherein the remote configuration receiver is configured to receive the remote requested configuration; and wherein the remote requested configuration comprises a selection of one or more message buses and an address selection.

The remote requested configuration may be received from the rolling stock. Alternatively, the remote requested configuration may be received from a remote system via for example an Ethernet connection and/or a wireless connection. This way, the device may be remotely (re)-configured without needing a manual intervention on the device or on the on board devices, for example, the device may be updated over the air, and a large fleet of devices may be updated simultaneously over the air and over a large fleet of components on board rolling stock. In other words, the remote requested configuration is received from for example a remote rule editor, and the remote requested configuration is configured to configure and/or update the device on the fly. This lowers the occurrence of errors which occur when manually intervening on the device which might lead to an immobilization of the rolling stock, and this further ensures that the configuration of the device remains flexible. The remote requested configuration is therefore programmed remotely and is sent to the device.

According to an optional aspect of the invention, the processing engine is further configured to configure the standardizing unit in function of the remote requested configuration such that the standardizing unit receives the data messages from the universal input interface in function of the selection of one or more message buses.

The standardizing unit is configured by the processing engine to selectively receive data messages from the one or more message buses which are comprised in the received remote requested configuration. The standardizing unit is configured by the processing engine to selectively receive data at specific addresses, for example parameters of the rolling stock, which are comprised in the requested configuration. This way, the device is configured to read and/or process and/or monitor one or more specific parameters of the rolling stock and/or one or more specific components of the rolling stock, for example one or more specific on board devices. In other words, an operator or a technician can therefore set up a remote requested configuration and send the remote requested configuration to the device such that the device is remotely configured to retrieve data from one or more selected on board parameters or on board devices which are comprised in the remote requested configuration, thereby receiving data messages from the selected parameters or on board devices, and such that the device is remotely configured to retrieve data at specific addresses which are comprised in the remote requested configuration.

According to an optional aspect of the invention, the one or more processing rules comprise one or more of the following:
  one or more predefined metrics;
  one or more predefined keys;
  one or more predefined timestamps;
  one or more predefined thresholds;
  one or more algorithmic functions;
  one or more analogue rules;
  one or more counters;
  one or more downsampling or upsampling functions;
  an execution of one or more pretrained machine learning models;
  an execution of one or more pretrained deep learning models.

The processing engine of the device is a rule engine configured to execute one or more processing rules on the data comprised in the standardized data streams that the processing engine receives from the standardizing unit of the device. In other words, the processing engine is configured to apply the one or more processing rules to the data comprised in the standardized data streams. The processing engine is for example a central processing unit or CPU, with for example 1 GHz of processing power.

The processing rules are used or executed by the processing engine to analyze the data comprised in the standardized data streams corresponding to data messages received from the selected one or more message buses and the selected addresses corresponding to the address selection. The processing engine is configured to read and/or extract and/or analyze data from corresponding on board devices. For example, when the data in the standardized data streams exceeds a predefined threshold while it should not according to one processing rule, the processing engine determines that the data does not comply with the predefined threshold and the processing engine for example transmits the data.

The processing rules for example comprise predefined metrics, thereby for example indicating a metric value to which the data from the selected message bus and the selected address corresponding to the address selection should be equal. The processing rules for example comprise predefined metrics which correspond to data and/or parameters which should be retrieved by the processing engine from the data messages from the selected message buses and at the selected address corresponding to the address selection, and which can optionally be transmitted via the GSM module and/or the Ethernet module and/or the wireless transceiver. The processing rules for example comprise predefined keys thereby for example indicating a key to which the data from the selected message bus and the selected address corresponding to the address selection should be equal. The processing rules for example comprise predefined keys which correspond to data and/or parameters which should be retrieved by the processing engine from the data messages from the selected message buses and at the selected address corresponding to the address selection, and which can optionally be transmitted via the GSM module and/or the Ethernet module and/or the wireless transceiver. The processing rules for example comprise predefined timestamps which correspond to timestamps which should be retrieved by the processing engine from the data messages, and which can optionally be transmitted via the GSM module and/or the Ethernet module and/or the wireless transceiver. The processing rules for example comprise predefined timestamps thereby for example indicating a timestamp at which the data from the selected message bus and the selected address corresponding to the address selection should change or be equal to a predefined metric value. The processing rules for example comprise predefined thresholds thereby for example indicating a threshold that the data from the selected message bus and the selected address corresponding to the address selection should not be larger than or smaller than the threshold. The processing rules for example comprise digital functions and/or algorithmic functions, such as for example digital signal processing or DSP, integrating functions, derivative functions, multiplexing functions, conversion functions, Fourier transforms, etc. The processing rules for example comprise one or more analogue rules to be applied on the analogue data received by the device. For example, the processing rules comprise predefined analogue metrics which should be retrieved by the processing engine from the data messages, and which can optionally be transmitted via the GSM module and/or the Ethernet module and/or the wireless transceiver. For example, the processing rules comprise predefined analogue rules which should be applied by the processing engine on the data comprised in the data messages retrieved from the selected bus and at the selected address corresponding to the address selection, and which can optionally be transmitted via the GSM module and/or the Ethernet module and/or the wireless transceiver. The processing rules for example comprise one or more counters which are executed by the processing engine to count for example predefined metrics which are retrieved by the processing engine from the data messages over a predefined time period, and the one or more counters can optionally be transmitted via the GSM module and/or the Ethernet module and/or the wireless transceiver. The processing rules for example comprise an execution of one or more pretrained machine learning models, such as for example decision trees, linear or polynomial regressions, recurrent neural network or RNN. The processing rules for example comprise an execution of one or more pretrained deep learning models. The training of the machine learning models and/or the deep learning models is not performed by the device, but the device is fed the pretrained machine learning models and/or pretrained deep learning models which are trained remotely, thereby saving processing power and capacity to the device.

According to an optional aspect of the invention, the standardizing unit comprises:

at least one RS232 transceiver, configured to convert data messages with RS232 physical layer into TTL logic level signals;

at least one RS485 transceiver, configured to convert data messages with RS485 physical layer into TTL logic level signals;

at least one CAN transceiver, configured to convert data messages with CAN physical layer into TTL logic level signals;

at least one physical layer selector, configured to receive the selection of one or more messages buses from the processing engine and further configured to select the RS232 transceiver or the RS485 transceiver or the CAN transceiver in function of the selection of one or more messages buses; and a Field-Programmable Gate Array comprising:

the plurality of codecs, configured to decode said TTL logic level signals into standardized data streams;

a multiplexer, configured to select one of the codecs in function of the requested configuration; and a data message filtering and routing unit, configured to filter the standardized data streams.

A physical layer selector is configured by the processing engine to select one of the transceivers of the standardizing unit in function of the selection of the message buses comprised in the remote requested configuration received by the processing engine. In other words, the transceivers are selected one at a time to retrieve data messages from the selection of message buses comprised in the remote requested configuration. Additionally, a single multiplexer of the Field-Programmable Array, also referred to as FPGA, selects, for each data message received from a selected message bus as configured by the remote requested configuration, which one or more codecs to use to decode the corresponding data messages, such that all the data messages received from this message bus are converted into a uniform format of standardized data streams. The data message filtering and routing unit filters the standardized data streams as requested by the remote requested configuration, for example deleting data from the standardized data streams which is not to be found at an address comprised in the address selection. The data message filtering and routing unit further routes the standardized data streams to for example the processing engine. Alternatively, the device optionally comprises a memory, such as for example a CPU cache or a memory shared between the FPGA and the processing engine, configured to store data messages and/or standardized data streams and/or remote requested configurations and/or processing rules and/or data of the rolling stock.

According to an optional aspect of the invention, the processing engine is further configured to execute one or more of the one or more processing rules on the data of the standardized data streams, thereby analyzing the data comprised in the data messages.

The processing engine executes the rules to read and/or analyze the data comprised in the standardized data streams received from the selected one or more message busses and the selected addresses corresponding to the address selection. In other words, the processing engine acts as a rule engine which executes the processing rules on the standardized data streams filtered by the FPGA of the standardizing unit. The processing engine thereby determines a physical state of the rolling stock. The analogue data and/or the internal data may optionally be used by the processing engine when the processing engine executes one or more processing rules.

According to an optional aspect of the invention, the device further comprises a GSM module and/or an Ethernet port and/or a wireless transmitter, and wherein the processing engine is further configured to send the data via the GSM module and/or the Ethernet port and/or the wireless transceiver.

The GSM module and/or the Ethernet port and/or the wireless transceiver are used to send the data of the rolling stock to a remote system, which can be on board the rolling stock, thereby alerting in real-time an operator or a technician on the rolling stock, or not on board the rolling stock, for example in the cloud. For example, the device optionally comprises a wireless connectivity which allows remote systems to access the database remotely, thereby sharing knowledge on the physical state of the rolling stock in real-time. This way, mobile team interventions can for example follow up data of the rolling stock for example in a web application. Additionally, the wireless connectivity provided by the GSM module and/or an Ethernet port and/or a wireless transmitter renders the configuration of the device flexible. Updates of the configuration of the device, such as for example updates on the bus mapping, can happen over the air without having any impact on the safety case of the rolling stock.

According to an optional aspect of the invention, the device further comprises a GPS module configured to generate location information, and wherein the processing engine is further configured to couple the location information to the data.

A geographical location of the rolling stock can be coupled to its data. This way, data of the rolling stock can be transmitted to an operator and/or a technician together with a geographical indication of where the data of the rolling stock was collected and/or processed and/or monitored. This helps an operator and/or a technician drawing a map of the condition of the rolling stock as a function of the geographical location of the rolling stock and further allows an operator and/or a technician identifying geographical locations of the read and/or processed data the rolling stock. This way, it may be possible to relate the changes in condition of the rolling stock to events the rolling stock is subjected to at a given geographical location.

According to a second aspect of the invention, there is provided an assembly configured to process data comprised in data messages passing on message buses of a rolling stock, the assembly comprising a device according to a first aspect of the invention and wherein the assembly further comprises message buses complying with the three following physical layers:
RS232;
R485;
CAN.

According to a third aspect of the invention, there is provided a system comprising a device according to a first aspect of the invention and further comprising a remote rule editor configured to generate the remote requested configuration; and wherein the device is operationally coupled to the remote rule editor via the remote configuration receiver.

This way, the device is remotely updated and configured over a communication network and on the fly. Usually, performance monitoring systems comprise TCMS faults codes which are programmed once during manufacturing of the performance monitoring systems and updated only for safety and compliance reasons, rarely for maintenance reasons. As the device is safe and does not necessarily interfere with the software of the rolling stock and/or with the message buses, the system provides a much faster iteration rate to design new rules. The rule editor for example comprises a web application where a third part can program rules on the device and retrieve telematics messages such as via Web, Message Queuing Telemetry Transport or MQTT, or HTTP Rest for example.

According to an optional aspect of the invention, the remote rule editor comprises a rule generating user interface enabling one or more user to generate the one or more processing rules.

The device is preferably operationally coupled to the remote rule editor via the remote configuration receiver. The device may alternatively comprise the remote rule editor. Preferably, the remote rule editor is preferably not comprised in the device thereby allowing remote updates of the configuration of the device. The remote rule editor is configured to allow an operator and/or a technician edit a remote requested configuration for the rolling stock. The remote requested configuration comprises one or more processing rules which are therefore generated at the side of an operator and/or a technician. It is therefore possible to select which message bus or buses are to be monitored.

According to an optional aspect of the invention, the system further comprises one or more deported acquisition modules and one or more communication links; and wherein:
each of the deported acquisition modules comprises:
a deported universal input interface, configured to receive deported data messages complying with the three following physical layers:
RS232;
RS485;
CAN;
from message buses, the deported data messages comprising deported data;
a deported standardization unit, configured to decode in function of a remote requested configuration the deported data messages into standardized deported data streams comprising the deported data;
the processing engine of the device is further configured to configure, over the one or more communication links, each of the deported standardizing units in function of the remote requested configuration such that each of the standardizing units receives deported data messages from the respective deported universal input interface in function of the selection of one or more message buses;
each of the deported acquisition modules is further configured to provide the processing engine of the device with the standardized deported data streams comprising the deported data over the one or more communication links
the processing engine is further configured to receive the standardized deported data streams from the deported acquisition modules; and
the processing engine is further configured to process the deported data by applying one or more of the one or more processing rules on the deported data of the standardized deported data streams in function of the remote requested configuration.

This way, a mesh of deported acquisition modules is created in the rolling stock to process deported data of the rolling stock. The device remotely configures each deported acquisition module and each deported acquisition module provides the device with standardized deported data streams comprising the deported data. This way, the device receives standardized deported data streams comprising deported data from or more message buses to which it is coupled via deported acquisition modules. In other words, when for example the universal input interface is not able to receive data messages from additional message buses, for example when all the connecting ports of the universal input interface are already occupied by the message buses, one or more deported acquisition modules are configured to received deported data messages comprising deported data from these additional message buses, and the one or more deported acquisition modules are further configured to decode the deported data messages into standardized deported data streams comprising the deported data in function of a remote requested configuration they received from the device. The device is then further configured to receive the standardized deported data streams over one or more communication links and to therefrom process the deported data of the rolling stock. In other words, the processing engine processed the deported data of the rolling stock in function of one or more of said processing rules of the remote requested configuration.

According to an optional aspect of the invention, the one or more communication links comprise one or more of the following:
  a wireless communication link;
  an Ethernet communication link.

Optionally, the deported acquisition modules can only communicate with the device according to the present invention.

According to a fourth aspect of the invention, there is provided a method for processing data from data messages passing on message buses of a rolling stock, the method comprising the steps of:
  receiving at a universal input interface data messages complying with the three following physical layers:
    RS232;
    RS485;
    CAN;
    from the message buses, the data messages comprising data;
  receiving a remote requested configuration comprising one or more processing rules;
  decoding in function of the remote requested configuration the data messages into standardized data streams comprising the data; and
  processing the data by applying one or more of the one or more processing rules on the data of the standardized data streams in function of the remote requested configuration.

The method according to the present invention comprises the use of a universal input interface. The method is configured to process data comprised in data messages passing on message buses using RS232 physical layer and on message buses using RS485 physical layer and on message buses using CAN physical layer. In other words, the method according to the present invention comprises receiving data messages complying with three different physical layers and/or different protocols. Devices within the same locomotive or the same railroad car, which comprise different input and/or output interfaces which can be incompatible with each other, are all able to communicate through the single universal input interface. The method according to the present invention therefore offers a unified platform to which a majority and preferably all of the on board devices of the rolling stock may be coupled without the need to interpose for example extension cards or plug connectors. The method according to the present invention converts all the data messages received at the universal input interface into standardized data streams independently from the physical layer used by the message bus on which the data messages pass. When using the method according to the present invention, monitoring systems for railway fleet management must not comprise a plurality of plug connectors and of interface or extension cards anymore, thereby rendering their implementation in rolling stock simple and easy. The method according to the present invention allows a continuous, real-time, fail-safe, non-intrusive and centralized monitoring of the condition of a rolling stock.

According to a fifth aspect of the invention, there is provided a method for data comprised in data messages passing on message buses of a rolling stock, the method comprising the steps of:
  providing one or more deported acquisition modules and one or more communication links, wherein each of the deported acquisition modules comprises a deported universal input interface and a deported standardizing unit;
  receiving, via the deported universal input interfaces, deported data messages complying with the three following physical layers:
    RS232;
    RS485;
    CAN;
    from message buses, the deported data messages comprising deported data;
  decoding, in function of a remote requested configuration and via the deported standardizing units, the deported data messages into standardized deported data streams comprising the deported data;
  configuring, over the one or more communication links, each of the deported standardizing units in function of the remote requested configuration such that each of the standardizing unit receives deported data messages from the respective deported universal input interface in function of a selection of one or more message buses;
  providing, via each of the deported acquisition modules, the processing engine of the device according to a first aspect of the invention with the standardized deported data streams comprising the deported data over the one or more communication links;
  receiving the standardized deported data streams from the deported acquisition modules; and
  processing the deported data by applying one or more of the processing rules on the deported data of the standardized deported data streams in function of the remote requested configuration.

DETAILED DESCRIPTION OF EMBODIMENT(S)

Figure 1:
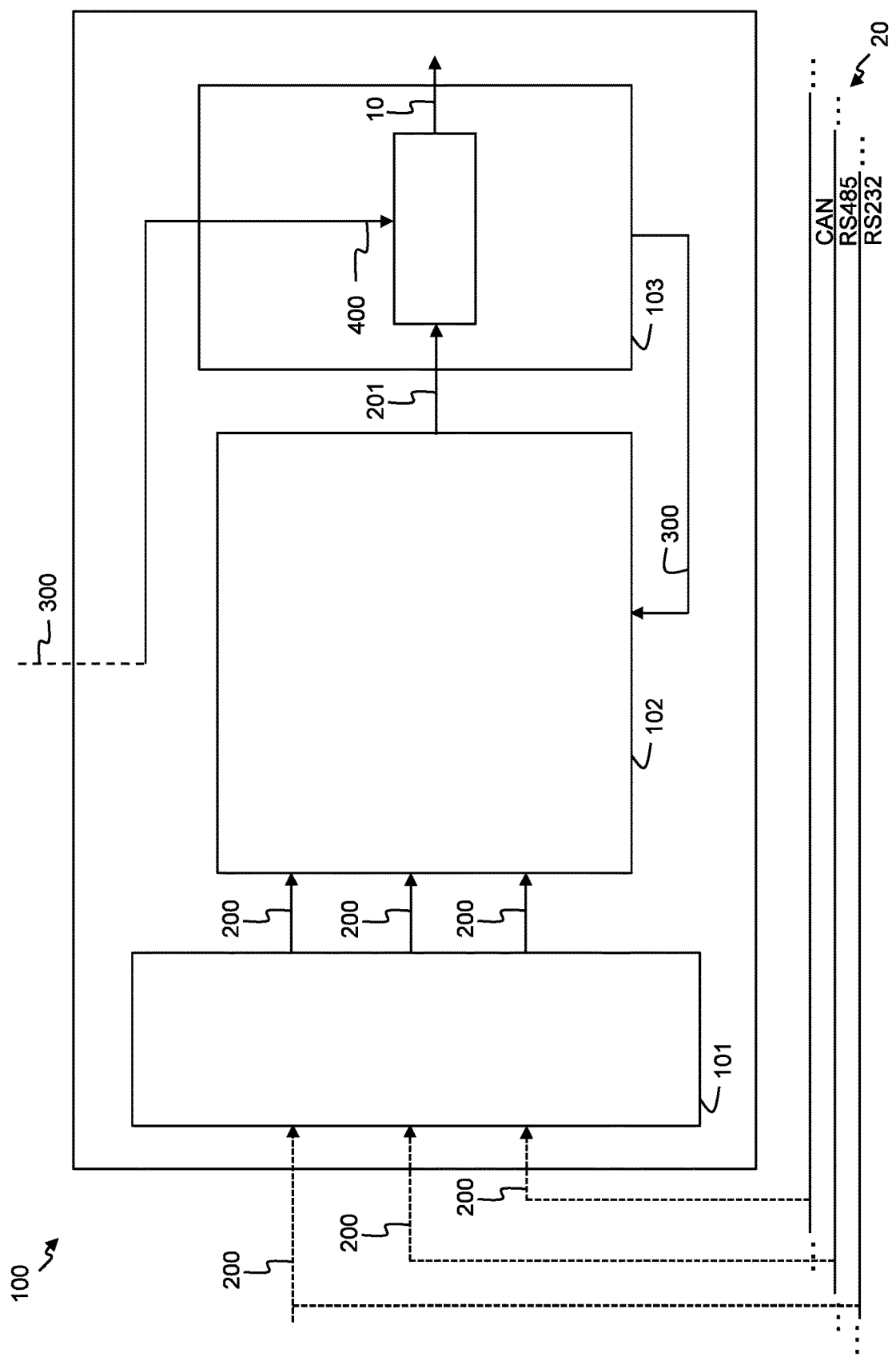
FIG. 1 schematically illustrates an embodiment of a device according to the present invention.

According to an embodiment shown in FIG. 1, a device 100 comprises a universal input interface 101, a standardizing unit 102 and a processing engine 103. Rolling stock comprises the device 100. Preferably, the device 100 is on board a rolling stock. The universal input interface 102 receives data messages 200 from one or more messages buses 20. The data messages 200 pass on message buses 20 using RS232 physical layer and RS485 physical layer and CAN physical layer. The data messages 200 passing on the different buses are different from each other. The one or more message buses 20 for example comprise one or more buses 20 using RS232 physical layer such as one or more serial interfaces. The one or more message buses 20 for example comprise one or more buses 20 using RS485 physical layer such as one or more message buses 20 with physical layers defined by one or more of the following: J1708, Multifunction Vehicle Bus, Modbus, On-Board diagnostic, a serial interface, etc. The one or more message buses 20 for example comprise one or more buses 20 using CAN physical layer such as one or more message buses 20 with physical layers defined by one or more of the following: J1939, Controller Area Network, etc. The one or more buses 20 for example comprise one or more Ethernet buses. The one or more buses 20 for example comprise one or more digital buses. The one or more buses 20 for example comprise one or more analog buses. In other words, the universal input interface 102 receives data messages 200 complying with the three following physical layers: RS232, RS485, CAN, from the message buses 20, and the data messages 200 comprise data 10. The standardizing unit 102 receives the data messages 200 from the universal input interface 101. The standardizing unit 102 decodes the data messages 200 into standardized data streams 201 comprising the data 10 in function of a remote requested configuration 300 received by the device 100, wherein the remote requested configuration 300 comprises one or more processing rules 400. The processing engine 103 receives the remote requested configuration 300 and receives the standardized data streams 201 comprising the data 10 from the standardizing unit 102. The remote requested configuration 300 comprises one or more processing rules 400. The processing engine 103 processes the data 10 of the rolling stock from the standardized data streams 201 in function of the remote requested configuration 300 by applying one or more of the one or more processing rules 400 on the data 10 of the standardized data streams 201.

Figure 2:
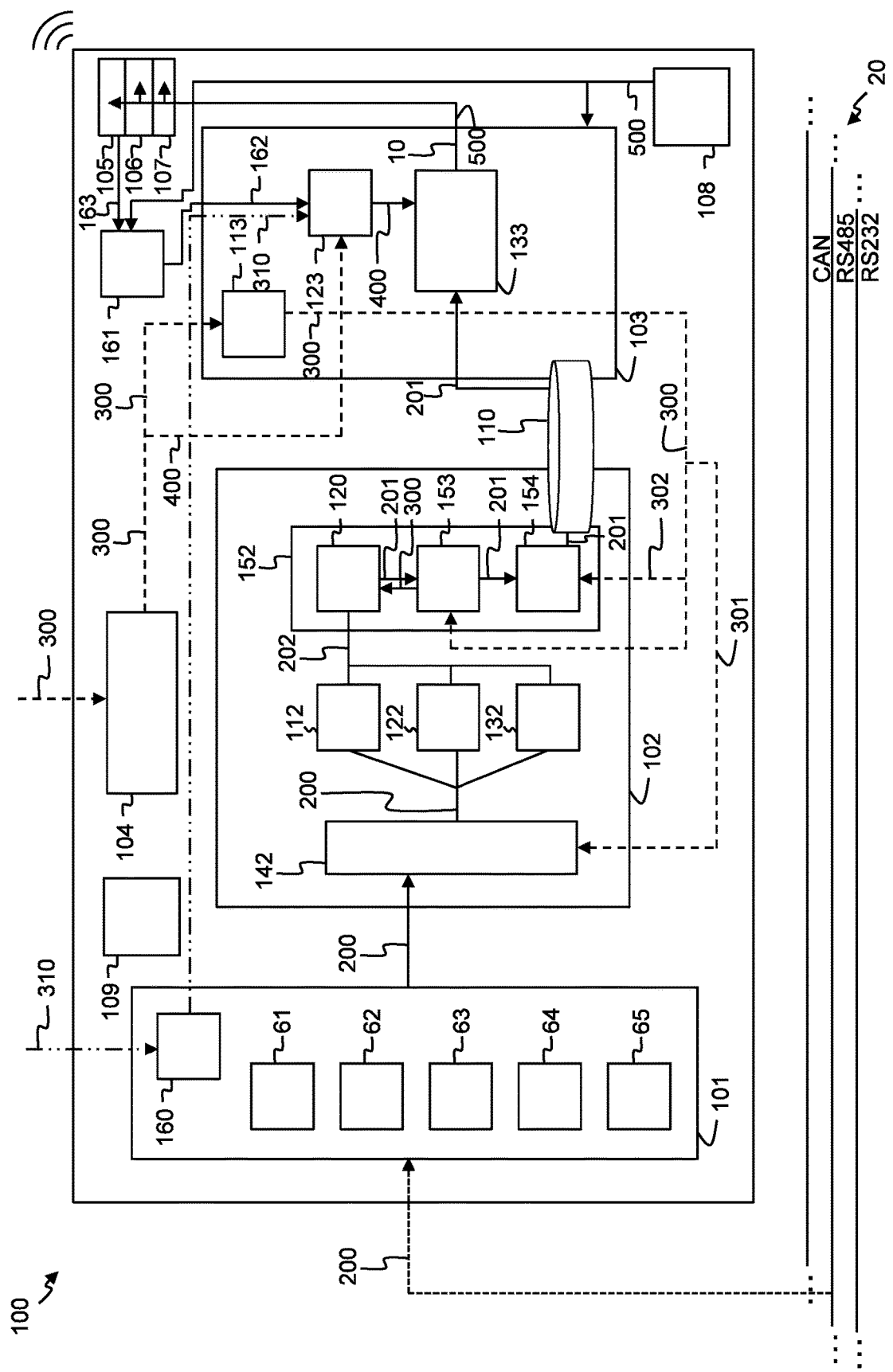
FIG. 2 schematically illustrates an embodiment of a device according to the present invention.

According to an embodiment shown in FIG. 2, a device 100 comprises a universal input interface 101, a standardizing unit 102 and a processing engine 103. Rolling stock comprises the device 100. Preferably, the device 100 is on board a rolling stock. The device 100 further comprises a battery 109. Optionally, the universal input interface 101 of the device 100 further comprises an analogue data collecting unit 160 which is configured to collect analogue data 310 from the rolling stock and/or any device on board the rolling stock. For example, the analogue data collecting unit 160 is configured to receive analogue data 310 from the rolling stock. Optionally, the device 100 further comprises an internal data collecting unit 161 configured to collect internal data 162 from the device 100. For example, the internal data 162 comprises a battery level of the battery 109 of the device 100 which is collected from the device 100 by the internal data collecting unit 161, and/or the internal data 162 comprises for example a temperature of the device 100, and/or the internal data 162 comprises location information 500 about the rolling stock, and/or the internal data 162 comprises information generated by the GSM module 105 and/or the wireless transmitter 107, for example cellular data 163 from the GSM module 105. According to an alternative embodiment, the device 100 comprises a power-supply plug 109 configured to be coupled to a power supply source. The device 100 further comprises a remote configuration receiver 104 configured to receive a remote requested configuration 300, wherein the remote requested configuration 300 comprises one or more processing rules 400. The universal input interface 101 receives data messages 200 from one or more messages buses 20. The universal input interface 101 comprises at least one RS232 input module 61 configured to receive data messages 200 complying with RS232 physical layer, such as one or more data message 200 complying with serial interfaces, etc. The universal input interface 101 further comprises at least one RS485 input module 62 configured to receive data messages 200 complying with RS485 physical layer, such as one or more data message 200 complying with physical layers defined by one or more of the following: J1708, Multifunction Vehicle Bus, Profibus, Modbus, On-Board Diagnostic, a serial interface, etc. The universal input interface 101 further comprises at least one CAN input module 63 configured to receive data messages 200 complying with CAN physical layer, such as one or more data message 200 complying with physical layers defined by one or more of the following: J1939, Controller Area Network, etc. Optionally, the universal input interface 101 further comprises at least one Ethernet input module 64 configured to receive data messages 200 complying with the PROFINET standard and/or one or more data messages 200 complying with a Train Communication Network such as Ethernet Train Backbone. Optionally, the universal input interface 101 further comprises at least one digital input module 65 configured to receive digital data messages 200. The data messages 200 pass on message buses 20 using RS232 physical layer and RS485 physical layer and CAN physical layer. The data messages 200 passing on the different buses are different from each other. The one or more message buses 20 for example comprise one or more buses 20 using RS232 physical layer such as one or more serial interfaces. The one or more message buses 20 for example comprise one or more buses 20 using RS485 physical layer such as one or more message buses 20 with physical layers defined by one or more of the following: J1708, Multifunction Vehicle Bus, Modbus, On-Board diagnostic, a serial interface, etc. The one or more message buses 20 for example comprise one or more buses 20 using CAN physical layer such as one or more message buses 20 with physical layers defined by one or more of the following: J1939, Controller Area Network, etc. The one or more buses 20 may for example comprise one or more Ethernet buses. The one or more buses 20 may for example comprise one or more digital buses. In other words, the universal input interface 102 receives data messages 200 complying with the three following physical layers: RS232, RS485, CAN, from the message buses 20, and the data messages 200 comprise data 10. The standardizing unit 102 receives the data messages 200 from the universal input interface 101. On FIG. 1, the universal input interface 101 receives data messages 200 from one message bus 20. The standardizing unit 102 comprises a physical layer selector 142, a RS232 transceiver 112, a RS485 transceiver 122, a CAN transceiver 132 and a Field-Programmable Gate array 152 also referred to as a FPGA 152. The physical layer selector 142 of the standardizing unit 102 receives the data messages 200 from the universal input interface 101. The standardizing unit 102 decodes the data messages 200 into standardized data streams 201 comprising the data 10 in function of the remote requested configuration 300. The physical layer selector 142 receives a selection 301 of one or more message buses 20 from the processing engine 103 from which the device 100 reads and/or processes data messages 200 in order to process data 10 of the rolling stock. In other words, the processing engine 103 configures the standardizing unit 102 in function of the remote requested configuration 300 such that the standardizing unit 102 reads and/or collects data messages 200 for processing from the universal input interface 101 in function of the selection 301 of one or more message buses 20. The remote requested configuration 300 comprises the selection 301 of one or more message buses 20 and an address selection 302. The physical layer selector 142 selects the RS232 transceiver 112 or selects the RS485 transceiver 122 or selects the CAN transceiver 132 in function of the selection 301 of the one or more message buses 20. The RS232 transceiver 112 converts the data messages 200 with RS232 physical layer into TTL logic level signals 202. The RS485 transceiver 122 converts the data messages 200 with RS485 physical layer into TTL logic level signals 202. The CAN transceiver 132 converts the data messages 200 with CAN physical layer into TTL logic level signals 202. The FPGA 152 comprises a plurality of codecs 120, wherein each of the codecs 120 decodes the corresponding TTL logic level signals 202 into standardized data streams 201. The FPGA 152 further comprises a multiplexer 153 which selects one of the codecs 120 in function of the remote requested configuration 300. In other words, the processing engine 103 configures the multiplexer 153 of the FPGA 152 in function of the remote requested configuration 300 to select and activate one of the codecs 120 to decode the corresponding TTL logic level signals 202 into standardized data streams 201 comprising the data 10. The multiplexer 153 is further configured to collect the standardized data streams 201 decoded by the activated codec 120 and further configured to transmit the standardized data streams 201 to a data message filtering and routing unit 154. According to an alternative embodiment, the FPGA 152 further comprises a second multiplexer configured to collect the standardized data streams 201 decoded by the activated codec 120 and further configured to transmit the standardized data streams 201 comprising the data 10 to a data message filtering and routing unit 154. The FPGA 152 further comprises a data message filtering and routing unit 154 which filters the standardized data streams 201. For example, the processing engine 103 is configured to configure the data message filtering and routing unit 154 in function of the remote requested configuration 300. More particularly, the processing engine 103 is configured to configure the data message filtering and routing unit 154 in function of the address selection 302 of the remote requested configuration 300. The data message filtering and routing unit 154 then filters from the standardized data streams 201 received from the multiplexer 153 only the standardized data streams 201 corresponding to the address selection 302 of the remote requested configuration 300. The data message filtering and routing unit 154 then outputs standardized data streams 201 comprising the data 10 corresponding to the address selection 302 of the remote requested configuration 300. The processing engine 103 receives the remote requested configuration 300 from the remote configuration receiver 104. The processing engine 103 also receives the standardized data streams 201 comprising the data 10 from the data message filtering and routing unit 154 of the standardizing unit 102. Optionally, the device 100 further comprises a memory 110. The memory 110 is shared between the FPGA 152 of the standardizing unit 102 and the processing engine 103. For example, the memory is CPU cache. According to an alternative embodiment, the processing engine 103 comprises the memory 110. According to a further alternative embodiment, the FGPA 152 comprises the memory 110. The data message filtering and routing unit 154 may optionally store standardized data streams 201 corresponding to the address selection 302 of the remote requested configuration 300 in the memory 110 and the processing engine 103 may optionally retrieve filtered standardized data streams 201 from the memory 110. The remote requested configuration 300 received from the remote configuration receiver 104 comprises one or more processing rules 400. The one or more processing rules 400 comprise one or more of the following: one or more predefined metrics, one or more predefined keys, one or more predefined timestamps, one or more predefined thresholds, one or more pretrained machine learning models, one or more pretrained deep learning models, one or more counters, one or more downsampling functions and/or unsampling functions, one or more algorithmic functions. The processing engine 103 processes data 10 of the rolling stock from the standardized data streams 201 in function of the remote requested configuration 300. The processing engine 103 comprises a data configuration receiver 113, a processing rules receiver 123 and a rule engine 133. The data configuration receiver 113 receives the remote requested configuration 300 from the remote configuration receiver 104. The processing rules receiver 123 receives the one or more processing rules 400 from the remote configuration receiver and further receives the analogue data 310 from the analogue data collecting unit 160 of the device 100 and/or further receives the internal data 162 from the internal data collecting unit 161. The processing engine 103 executes one or more of the processing rules 400 on the data 10 of the standardized data streams 201, thereby processing the data 10 of the rolling stock 10. In other words, the processing engine 103 comprises a rule engine 133 which executes one or more processing rules 400. The analogue data 310 and/or the internal data 162 may optionally be used by the rule engine 133 when executing one or more processing rules 400. For example, the device 100 executes a processing rule 400 according to a remote requested configuration 300 to access the temperature of the brakes of an asset of the rolling stock, the remote requested configuration 300 comprising a selection 301 of the message bus 20 on which data messages 200 comprising data 10 indicative for the temperature of the brakes of this asset pass. The remote requested configuration 300 further comprises an address selection 302 comprising information indicative for the address at which the temperature of the brakes is to be found in the data messages 200 passing on this message bus 20. The corresponding transceiver corresponding to the remote requested configuration 300 then converts the received data messages 200 into TTL logic level signals 202 which are decoded into standardized data streams 201 comprising the data 10 by the codec 120 corresponding to the remote requested configuration 300 received by the multiplexer 153 which selects the required codec 120. The data message filtering and routing unit 154 then extracts the temperature of the brakes from the standardized data streams 201 comprising the data 10 at the address in the standardized data streams 201 corresponding to the address selection 302. The processing engine 103 receives the standardized data streams 201 corresponding to the temperature of the brakes of the asset. The processing engine 103 receives the remote requested configuration 300 from the configuration receiver 104. The rules receiver 123 receives one processing rule 400 and/or optionally the analogue data 310 and/or optionally the internal data 162. The rule engine 133 of the processing engine 103 executes a processing rule 400 by comparing the temperature of the brakes to a predefined temperature threshold for the brakes of the asset. When the temperature of the brakes of the rolling stock exceeds the predefined temperature threshold, the rule engine 133 of the processing engine 103 determines that the data 10, i.e. for example the temperature of the brakes of the rolling stock 10 must be transmitted. The device 100 further comprises a GSM module 105 and/or an Ethernet port 106 and/or a wireless transmitter 107. The processing engine 103 sends the data 10 of the rolling stock to for example a remote system via the GSM module 105 and/or the Ethernet port 106 and/or the wireless transmitter 107. The device 100 further comprises a GPS module 108 that generates location information 500 about the rolling stock. The processing engine 103 receives this location information 500 from the GPS module 108 and couples the location information 500 to the data 10 of the rolling stock when sending the data 10 of the rolling stock to the GSM module 105 and/or the Ethernet port 106 and/or the wireless transmitter 107. This way, the processing engine 103 sends the data 10 of the rolling stock along with location information 500. According to an alternative embodiment, the state charge of the battery of a railway asset may be accurately and in real-time monitored by the device 100 when using a processing rule 400 comprising a linear regression of the voltage and current and temperature of the motor of a railway asset.

Figure 3:
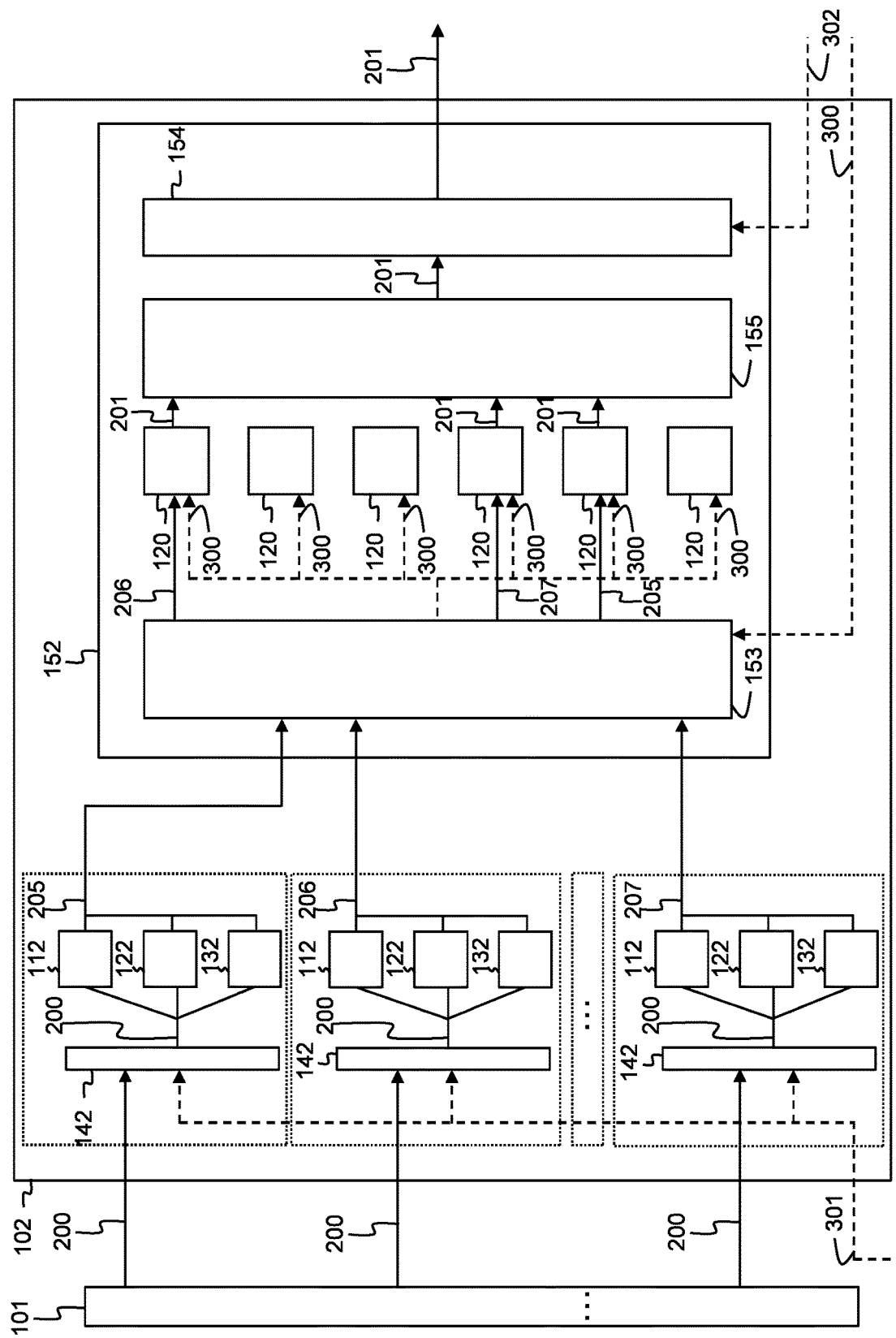
FIG. 3 schematically illustrates an embodiment of a standardizing unit according to the present invention.

According to an embodiment shown in FIG. 3, a standardizing unit 102 comprised in the device of FIG. 1 or FIG. 2 receives data messages 200 from one or more connectors of the universal input interface 101, for example three connectors. FIG. 3 is a zoom on an embodiment of the standardizing unit 102 of FIG. 1 or FIG. 2. Components having identical reference numbers to the components of FIG. 1 or FIG. 2 fulfil the same function. Each physical layer selector 142 of the standardizing unit 102 receives data messages 200 from one connector of the universal input interface 101. According to an alternative embodiment, the universal input interface 101 comprises a plurality of connectors, for example two, three, four, five, six, seven, eight, nine or ten, to receive data messages 200 from message buses 20, and the standardizing unit 102 comprises a plurality of corresponding groups of physical layer selectors 142 and transceivers 112;122;132, such as for example two groups of physical layer selectors 142 and transceivers 112;122;132, or three, or four, or five, or six, or seven, or eight, or nine, or ten groups of physical layer selectors 142 and transceivers 112;122;132. In other words, the standardizing unit 102 receives data messages 200 from the universal input interface 101 which receives data messages 200 passing on one or more messages buses 20 using RS232 physical layer and RS485 physical layer and CAN physical layer and the standardizing unit 102 comprises for example as many groups of physical layer selectors 142 and transceivers 112;122;132 than the number of connectors of the universal input interface 101. The data messages 200 passing on the different buses are different from each other. The one or more message buses 20 for example comprise one or more buses 20 using RS232 physical layer such as one or more serial interfaces. The one or more message buses 20 for example comprise one or more buses 20 using RS485 physical layer such as one or more message buses 20 with physical layers defined by one or more of the following: J1708, Multifunction Vehicle Bus, Modbus, On-Board diagnostic, a serial interface, etc. The one or more message buses 20 for example comprise one or more buses 20 using CAN physical layer such as one or more message buses 20 with physical layers defined by one or more of the following: J1939, Controller Area Network, etc. The one or more buses 20 for example comprise one or more Ethernet buses. The one or more buses 20 for example comprise one or more digital buses. In other words, the universal input interface 102 receives data messages 200 complying with the three following physical layers: RS232, RS485, CAN, from the message buses 20, and the data messages 200 comprise data 10. The standardizing unit 102 decodes the data messages 200 into standardized data streams 201 comprising the data 10 in function of a remote requested configuration 300. The remote requested configuration 300 comprises a selection 301 of one or more message buses 20 and an address selection 302. The physical layer selector 142 receives the selection 301 from the remote requested configuration 300 of one or more message buses 20 from which the standardizing unit 102 decodes data messages 200 in order to process data 10 of the rolling stock. In other words, the standardizing unit 102 collects data messages 200 from the universal input interface 101 in function of the selection 301 of one or more message buses 20. To each physical layer selector 142 is coupled a RS232 transceiver 112, a RS485 transceiver 122, a CAN transceiver 132 and a Field-Programmable Gate array 152 also referred to as a FPGA 152. Each physical layer selector 142 selects the corresponding RS232 transceiver 112 or selects the corresponding RS485 transceiver 122 or selects the corresponding CAN transceiver 132 in function of the selection 301 of the one or more message buses 20. Each RS232 transceiver 112 converts the data messages 200 with RS232 physical layer into TTL logic level signals 205;206;207. Each RS485 transceiver 122 converts the data messages 200 with RS485 physical layer into TTL logic level signals 205;206;207. Each CAN transceiver 132 converts the data messages 200 with CAN physical layer into TTL logic level signals 205;206;207. The standardizing unit 102 further comprises a FPGA 152 which comprises six codecs 120, wherein each of the codecs 120 decodes the corresponding TTL logic level signals 205;206; 207 into standardized data streams 201 in function of the requested configuration 300 received from a single multiplexer 153. Each codec is configured to decode TTL logic level signals 205;206;207 corresponding to the type of physical interface on which the data messages 200 pass. According to an alternative embodiment, the FPGA 152 comprises a plurality of codecs, for example two, three, four, five, ten, tens, hundreds of codecs 120. The FPGA 152 further comprises the single multiplexer 153 which selects and activates one codec 120 for each group of physical layer selector 142 and transceivers 112;122;132, and therefore for each connector of the universal input interface 101, in function of the remote requested configuration 300. For example, on FIG. 3, the FPGA 152 selects one codec 120 for the first group of physical layer selector 142 and transceivers 112;122;132 and selects another codec 120 for the second group of physical layer selector 142 and transceivers 112; 122;132, and selects yet another codec 120 for the for third group of physical layer selector 142 and transceivers 112; 122;132. The single multiplexer 153 of the FPGA 152 is configured via the remote requested configuration 300 to select one or more of the codecs 120 to decode the corresponding TTL logic level signals 205;206;207 into standardized data streams 201 comprising the data 10. According to an alternative embodiment, the multiplexer 153 may select and activate a plurality of codecs 120 for each group of physical layer selector 142 and transceivers 112;122;132, and therefore for each connector of the universal input interface 101, in function of the remote requested configuration 300. For example, the multiplexer 153 may select and activate two codecs 120 when the data messages 200 corresponding to the TTL logic level signals pass on a message bus using RS485 physical layer such as Multifunction Vehicle Bus, and the two codecs 120 decode the corresponding TTL logic level signals into standardized data streams 201 comprising the data 10. For example, the multiplexer 153 may select and activate three codecs 120 when the data messages 200 corresponding to the TTL logic level signals pass on a message bus using CAN physical layer, and the three codecs 120 decode the corresponding TTL logic level signals into standardized data streams 201 comprising the data 10. The codecs 120 of the FPGA 152 which are not activated by the multiplexer 153 remain inactive during the decoding of the TTL logic level signals 205;206;207 into standardized data streams 201 comprising the data 10. The FPGA 152 further comprises a second multiplexer 155 which is configured to collect the standardized data streams 201 comprising the data 10 from all the selected and activated codecs 120. The FPGA 152 further comprises a data message filtering and routing unit 154 which filters the standardized data streams 201 comprising the data 10 received from the second multiplexer 155. According to an alternative embodiment, the multiplexer 153 comprises the second multiplexer 155. For example, the processing engine 103 is configured to configure the data message filtering and routing unit 154 via the remote requested configuration 300. More particularly, the data message filtering and routing unit 154 is configured via the address selection 302 of the remote requested configuration 300. The data message filtering and routing unit 154 then filters from the standardized data streams 201 comprising the data 10 received from the multiplexer 153 only the standardized data streams 201 corresponding to the address selection 302 of the requested configuration 300. The data message filtering and routing unit 154 then outputs standardized data streams 201 comprising the data 10 corresponding to the address selection 302 of the remote requested configuration 300. The output standardized data streams 201 comprising the data 10 are then fed to the processing engine of the device 100 of FIG. 1 or FIG. 2, as explained in the description of FIG. 1 and FIG. 2.

Figure 4:
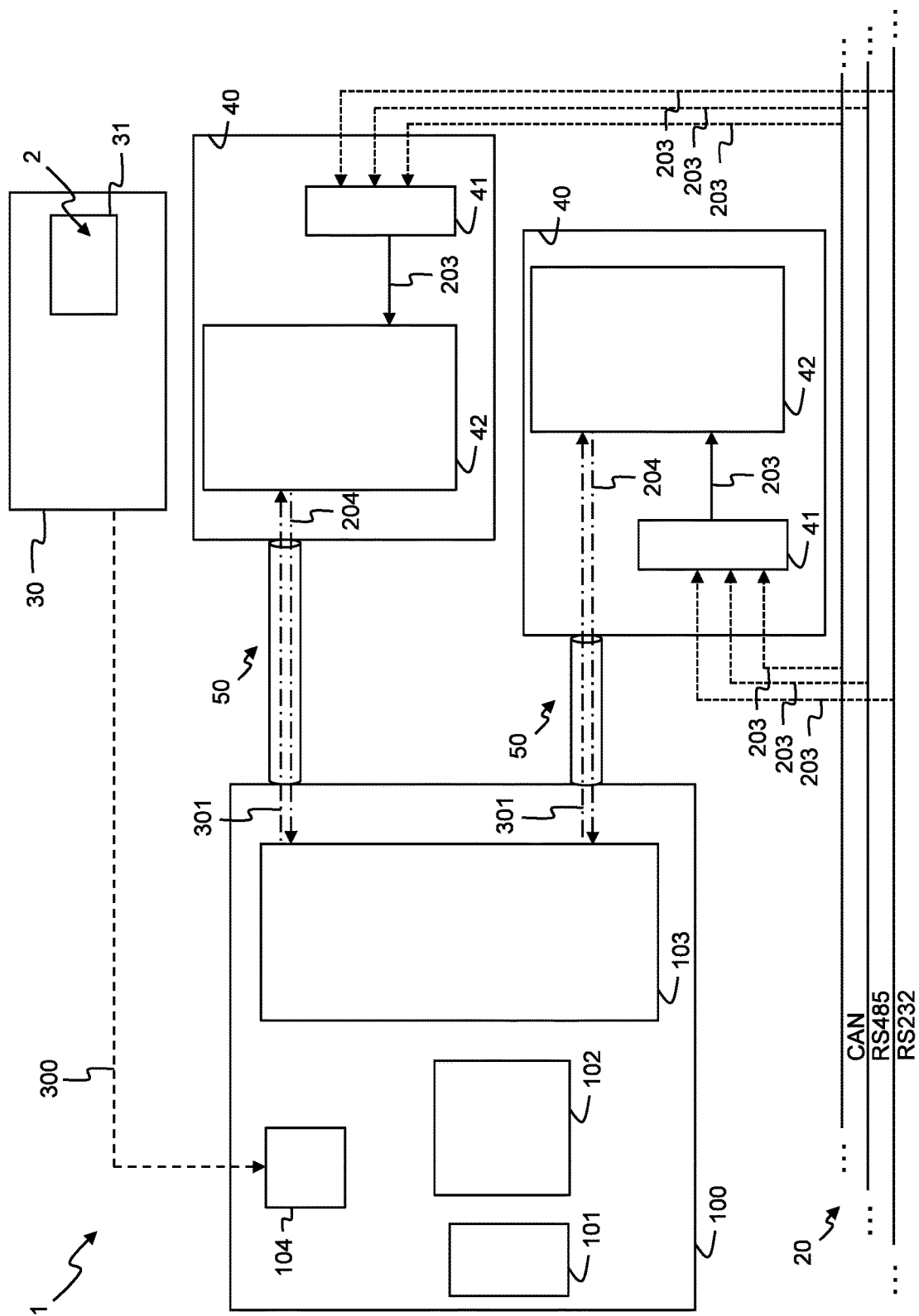
FIG. 4 schematically illustrates an embodiment of a system according to the present invention.

According to an embodiment shown in FIG. 4, a system 1 comprises a device 100 identical to the device 100 depicted in FIG. 1 and FIG. 2 or FIG. 3. Components having the same reference numbers perform the same function. The system 1 of FIG. 4 further comprises a remote rule editor 30 configured to generate the remote requested configuration 300. The remote rule editor 30 comprises a rule generating user interface 31 enabling one or more user 2 to generate the one or more processing rules 400. The device 100 is operationally coupled to the remote rule editor 30 via the remote configuration receiver 104. Optionally, the system 1 further comprises one or more deported acquisition modules 40, for example tens or hundreds of deported acquisition modules 40. Additionally, the system 1 further comprises one or more communication links 50, for example tens or hundreds of communication links 50. The one or more communication links 50 comprise one or more of the following: a wireless communication link, an Ethernet communication link. The communication links 50 are positioned between the device 100 and each of the deported modules 40 such that each of the deported modules 40 is operationally coupled to the device 100. According to an alternative embodiment, the communication links 50 are positioned between the universal input interface 101 of the device 100 and each of the deported modules 40. Each of the deported modules 40 comprises a deported universal input interface 41 and a deported standardization unit 42. The deported universal input interface 41 receives deported data messages 203 from message buses 20 using RS232 physical layer and RS485 physical layer and CAN physical layer. The deported data messages 200 passing on the different buses are different from each other. The deported standardization unit 42 decodes the deported data messages 203 into standardized deported data streams 204 comprising deported data 11 in function of the remote requested configuration 300. The processing engine 103 of the device 100 configures each of the deported standardizing units 42 over one or more of the communication links 50 in function of the remote requested configuration 300. This way, each of the standardizing units 42 receives deported data messages 203 comprising deported data 11 from the respective deported universal input interface 41 in function of the selection 301 of the one or more message buses 20. Each of the deported acquisition modules 40 is further configured to provide the processing engine 103 of the device 100 with the standardized deported data streams comprising the data 11 over the one or more communication links 50.

Figure 5:
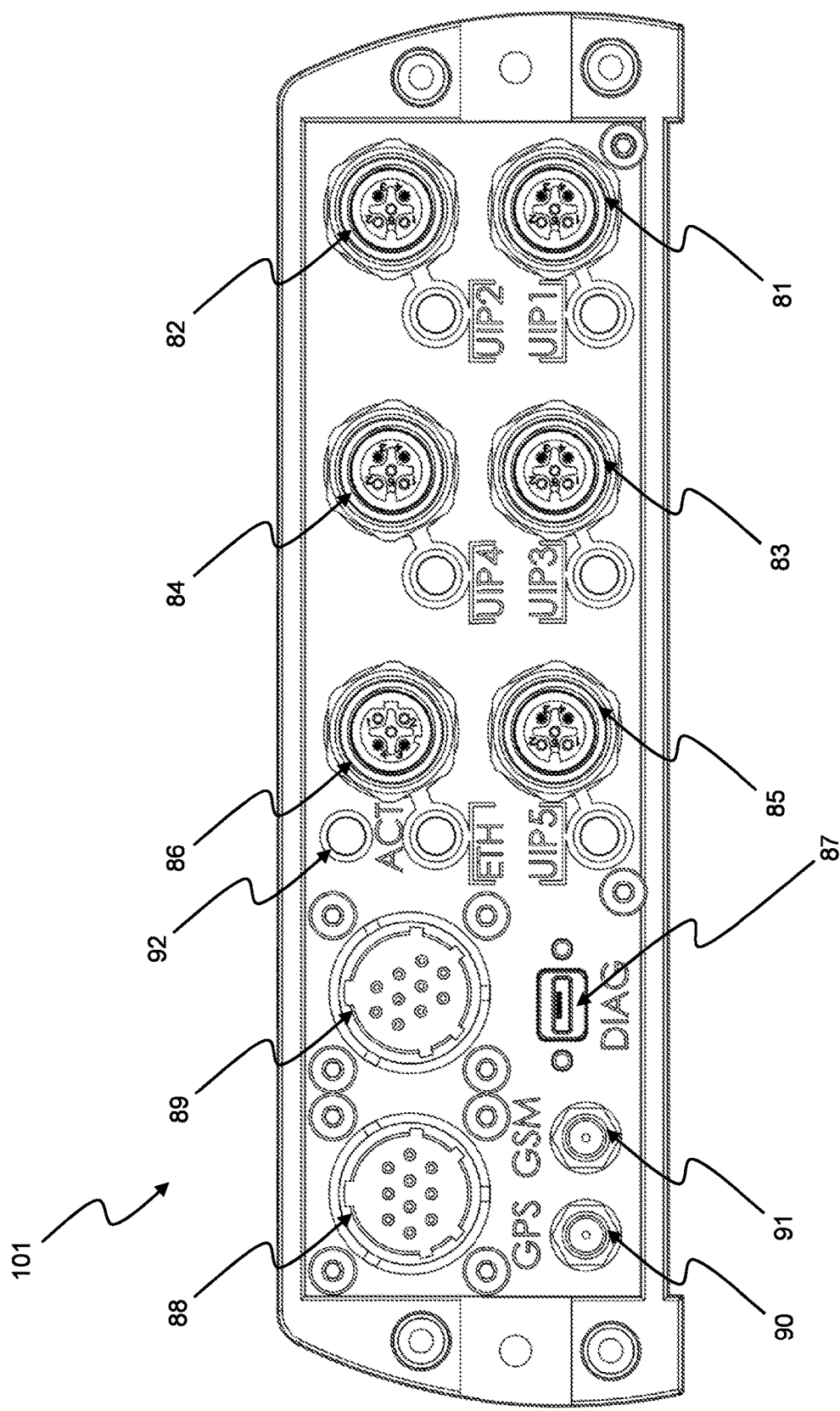
FIG. 5 schematically illustrates an embodiment of a universal input interface according to the present invention.

According to an embodiment shown in FIG. 5, the universal input interface 101 of the device 100 as depicted on FIGS. 1 to 4 comprises five identical universal input connectors 81;82;83;84;85. According to an alternative embodiment, the universal input interface 101 comprises one or more universal input connectors, for example one, two, three, four, six, seven, eight, nine, ten, etc. This way, the universal input interface 101 is able to receive data messages passing on message buses using RS232 physical layer and RS485 physical layer and CAN physical layer. The universal input interface 101 of the device 100 further comprises two connectors 88;89 for analogue data which allow the universal input interface 101 to receive analogue data. The universal input interface 101 of the device 100 further comprises an Ethernet connector 86 configured to receive and/or transmit data from the device 100. The universal input interface 101 of the device 100 further optionally comprises a LED ACT 92 which provides information indicative for a battery level of the device 100. The universal input interface 101 of the device 100 further optionally comprises a USB connector 87, a GPS connector 90 and/or a GSM connector 91.

Figure 6:
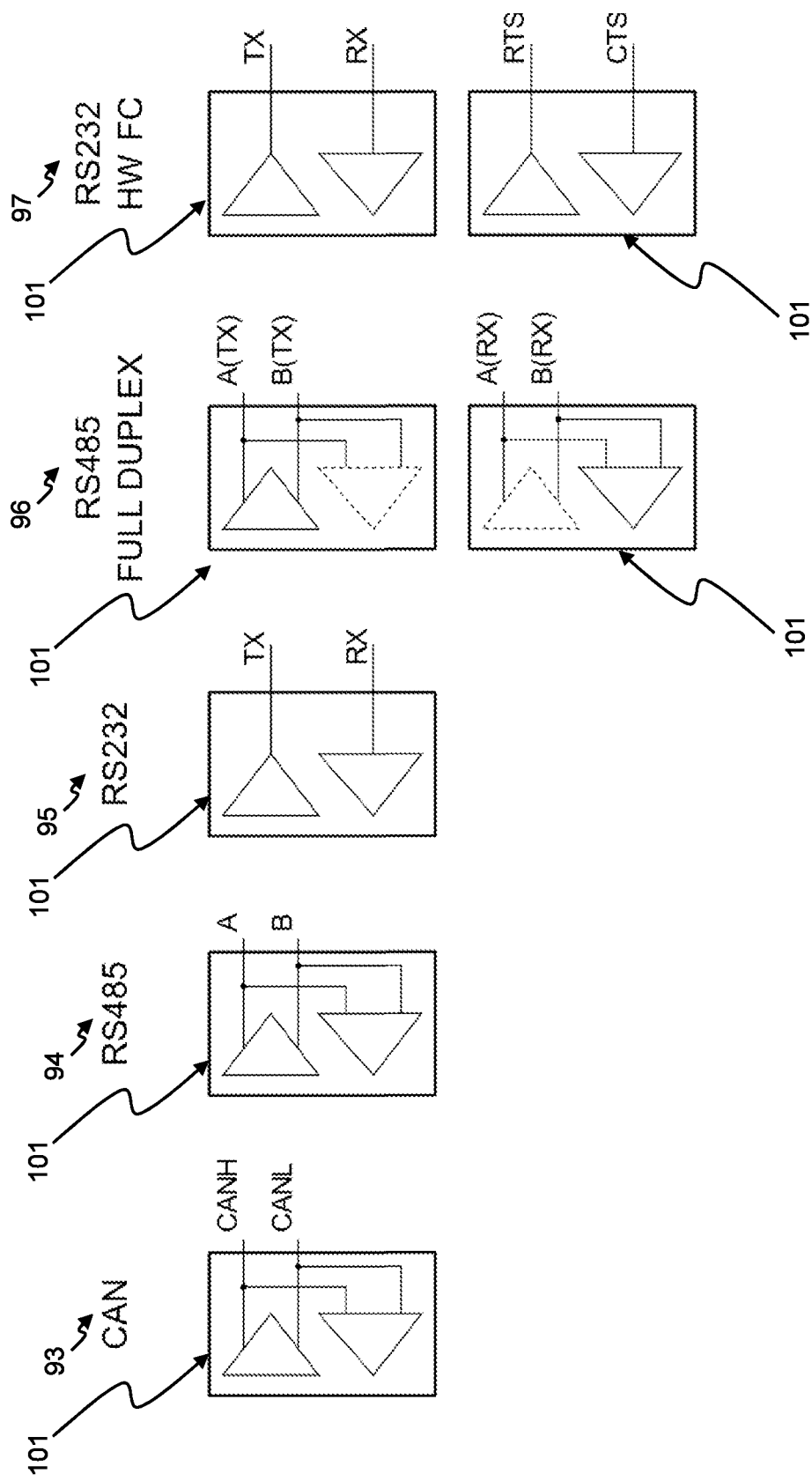
FIG. 6 schematically illustrates embodiments of a standardizing unit according to the present invention.

According to an embodiment shown in FIG. 6, several examples of configuration of the universal input interface 101 of FIG. 5 are depicted. The universal input connectors 81;82;83;84;85 of FIG. 5 are used to receive and/or transmit data messages from message buses using CAN physical layer, as depicted in the CAN configuration 93. The universal input connectors 81;82;83;84;85 of FIG. 5 are used to receive and/or transmit data messages from message buses using RS485 physical layer, as depicted in the RS485 configuration 94. The universal input connectors 81;82;83; 84;85 of FIG. 5 are used to transmit on and/or to receive from message buses using RS232 physical layer, as depicted in the RS232 configuration 95. The universal input connectors 81;82;83;84;85 of FIG. 5 are used to transmit on and/or receive from message buses using RS485 physical layer, as depicted in the RS485 full duplex configuration 96. The universal input connectors 81;82;83;84;85 of FIG. 5 are used to transmit on and/or to receive from or respectively to Request To Send and Clear To Send on message buses using RS232 physical layer, as depicted in the RS232 Hardware Flow Control configuration 97.

Figure 7:
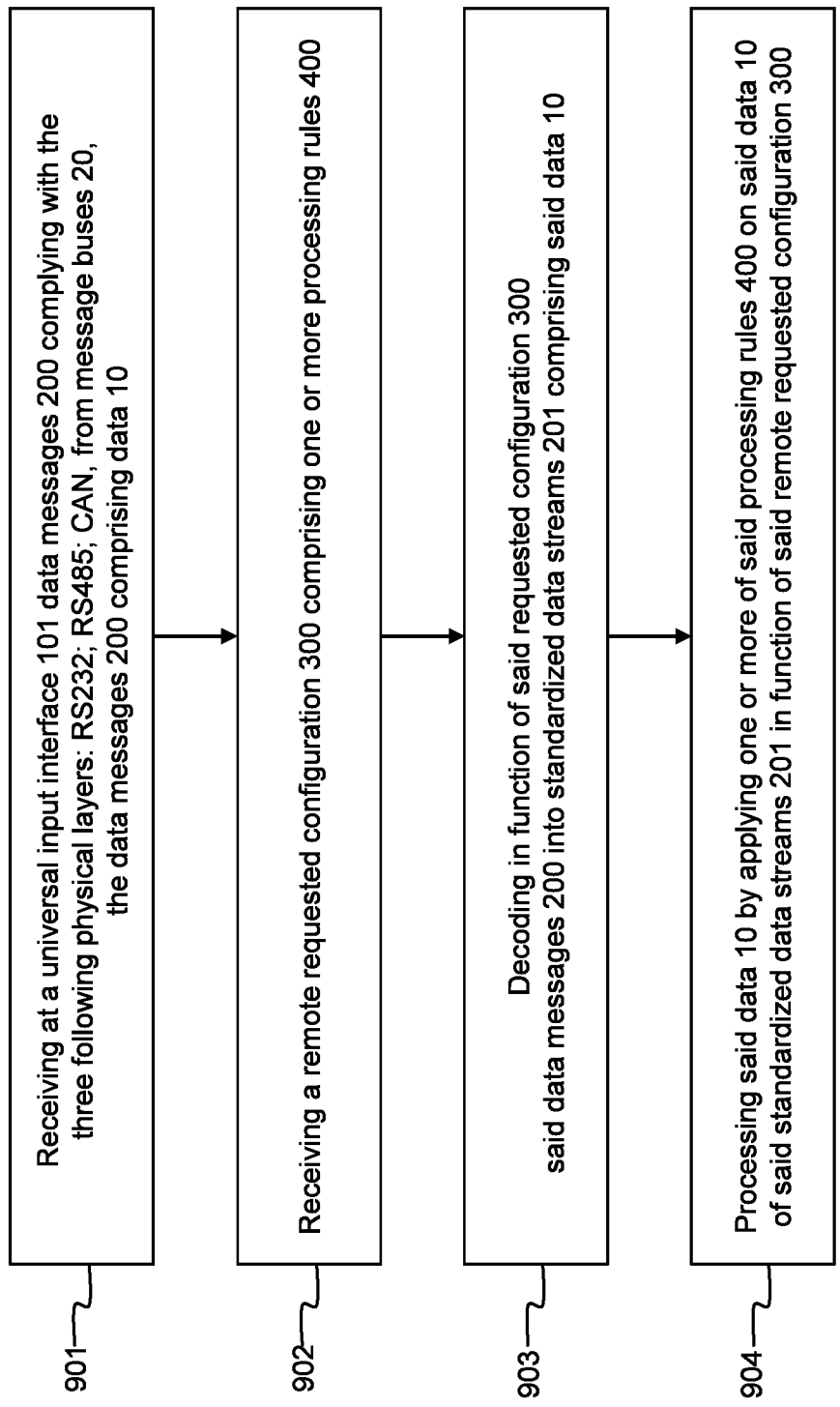
FIG. 7 schematically illustrates an embodiment of the steps of a method according to the present invention.

According to an embodiment shown in FIG. 7, a method is used for processing data 10 of a rolling stock from data messages 200 passing on message buses. The method comprises the step 901 of receiving data messages 200 complying with the three following physical layers: RS232, RS485, CAN, from message buses 20 via a universal input interface 101, wherein the data messages 200 comprise data 10. The method further comprises the step 902 of receiving a remote requested configuration 300 comprising one or more processing rules 400. The method further comprises the step 903 of decoding the data messages 200 into standardized data streams 201 comprising the data 10 in function of the remote requested configuration 300. In step 904, the method comprises processing the data 10 of the rolling stock from the standardized data streams 201 by applying one or more of the processing rules 400 of the remote requested configuration 300 on said data 10 of the standardized data streams 201 in function of the remote requested configuration 300

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device configured to process data comprised in data messages passing on message buses of a rolling stock, said device comprising:
 a single universal fieldbus input interface, configured to receive data messages complying with the three following physical layers:
  RS232; and
  RS485; and
  CAN;
 from said message buses, said data messages comprising data;
 a processing engine, configured to receive a remote requested configuration comprising one or more processing rules; and
 a standardizing unit, configured to decode in function of said remote requested configuration said data messages into standardized data streams comprising said data;
 wherein said processing engine is further configured to receive said standardized data streams from said standardizing unit,
 wherein said processing engine is further configured to process said data by applying one or more of said one or more processing rules on said data of said standardized data streams in function of said remote requested configuration and further configured to monitor a state of said rolling stock therefrom,
 wherein said standardizing unit comprises:
  a plurality of codecs configured to decode said data messages into said standardized data streams;
  at least one RS232 transceiver, configured to convert data messages with RS232 physical layer into TTL logic level signals;
  at least one RS485 transceiver, configured to convert data messages with RS485 physical layer into TTL logic level signals;
  at least one CAN transceiver, configured to convert data messages with CAN physical layer into TTL logic level signals;
  at least one physical layer selector, configured to receive a selection of one or more message buses from said processing engine and further configured to select said RS232 transceiver or said RS485 transceiver or said CAN transceiver in function of said selection of one or more message buses; and
  a Field-Programmable Gate Array comprising:
   said plurality of codecs, configured to decode said TTL logic level signals into standardized data streams;
   a multiplexer, configured to select one of said codecs in function of said requested configuration; and
   a data message filtering and routing unit, configured to filter said standardized data streams.

2. The device according to claim 1, wherein said universal fieldbus input interface comprises:
 at least one RS232 input module configured to receive data messages complying with RS232 physical layer;
 at least one RS485 input module configured to receive data messages complying with RS485 physical layer; and
 at least one CAN input module configured to receive data messages complying with CAN physical layer.

3. The device according to claim 1, wherein said device further comprises a remote configuration receiver,
 wherein said remote configuration receiver is configured to receive said remote requested configuration; and
 wherein said remote requested configuration comprises a selection of one or more message buses and an address selection.

4. The device according to claim 3, wherein said processing engine is further configured to configure said standardizing unit in function of said remote requested configuration such that said standardizing unit receives said data messages from said universal fieldbus input interface in function of said selection of one or more message buses.

5. The device according to claim 1, wherein said one or more processing rules comprise one or more of the following:
 one or more predefined metrics;

one or more predefined keys;
one or more predefined timestamps;
one or more predefined thresholds;
one or more algorithmic functions;
one or more analogue rules;
one or more counters;
one or more downsampling or upsampling functions;
an execution of one or more pretrained machine learning models;
an execution of one or more pretrained deep learning models.

6. The device according to claim 1, wherein said processing engine is further configured to execute one or more of said one or more processing rules on said data of said standardized data streams, thereby analyzing said data comprised in said data messages.

7. The device according to claim 1, wherein said device further comprises a GSM module and/or an Ethernet port and/or a wireless transmitter, and
wherein said processing engine is further configured to send said data via said GSM module and/or said Ethernet port and/or said wireless transceiver.

8. The device according to claim 1, wherein said device further comprises a GPS module configured to generate location information, and
wherein processing engine is further configured to couple said location information to said data.

9. An assembly configured to process data comprised in data messages passing on message buses of a rolling stock, said assembly comprising the device according to claim 1 and further comprising message buses complying with the three following physical layers:
RS232; and
RS485; and
CAN.

10. A system comprising the device according to claim 3 and wherein said system further comprises a remote rule editor configured to generate said remote requested configuration; and
wherein said device is operationally coupled to said remote rule editor via said remote configuration receiver.

11. The system according to claim 10, wherein said remote rule editor comprises a rule generating user interface enabling one or more user to generate said one or more processing rules.

12. The system according to claim 10, wherein said system further comprises one or more deported acquisition modules and one or more communication links; and wherein:
each of said deported acquisition modules comprises:
a deported universal fieldbus input interface, configured to receive deported data messages complying with the three following physical layers:
RS232; and
RS485; and
CAN;
from message buses, said deported data messages comprising deported data;
a deported standardization unit, configured to decode in function of a remote requested configuration said deported data messages into standardized deported data streams comprising said deported data;
said processing engine of said device is further configured to configure, over said one or more communication links, each of said deported standardizing units in function of said remote requested configuration such that each of said standardizing units receives deported data messages from said respective deported universal input interface in function of said selection of one or more message buses;
each of said deported acquisition modules is further configured to provide said processing engine of said device with said standardized deported data streams comprising said deported data over said one or more communication links;
said processing engine of said device is further configured to receive said standardized deported data streams from said deported acquisition modules; and
said processing engine of said device is further configured to process said deported data by applying one or more of said one or more processing rules on said deported data of said standardized deported data streams in function of said remote requested configuration and further configured to monitor a state of said rolling stock therefrom.

13. A method for processing data comprised in data messages passing on message buses of a rolling stock, said method comprising the steps of:
receiving at a single universal fieldbus input interface data messages complying with the three following physical layers:
RS232; and
RS485; and
CAN;
from message buses, said data messages comprising data;
receiving a remote requested configuration comprising one or more processing rules;
decoding, at a standardizing unit, in function of said remote requested configuration said data messages into standardized data streams comprising said data; and
processing said data by applying one or more of said one or more processing rules on said data of said standardized data streams in function of said remote requested configuration and monitoring a state of said rolling stock therefrom;
wherein said standardizing unit comprises:
a plurality of codecs configured to decode said data messages into said standardized data streams;
at least one RS232 transceiver, configured to convert data messages with RS232 physical layer into TTL logic level signals;
at least one RS485 transceiver, configured to convert data messages with RS485 physical layer into TTL logic level signals;
at least one CAN transceiver, configured to convert data messages with CAN physical layer into TTL logic level signals;
at least one physical layer selector, configured to receive a selection of one or more message buses and further configured to select said RS232 transceiver or said RS485 transceiver or said CAN transceiver in function of said selection of one or more message buses; and
a Field-Programmable Gate Array comprising:
said plurality of codecs, configured to decode said TTL logic level signals into standardized data streams;
a multiplexer, configured to select one of said codecs in function of said requested configuration; and
a data message filtering and routing unit, configured to filter said standardized data streams.

14. The device according to claim 2, wherein said data messages complying with RS232 physical layer comprise one or more data messages complying with serial interfaces.

15. The device according to claim 2, wherein said data messages complying with RS485 physical layer comprise one or more data messages complying with physical layers defined by one or more of the following: J1708, Multifunction Vehicle Bus, Profibus, Modbus, On-Board Diagnostic, a serial interface.

16. The device according to claim 2, wherein said data messages complying with CAN physical layer comprise one or more data messages complying with physical layers defined by one or more of the following: J1939, Controller Area Network.

17. The device according to claim 1, wherein said state of rolling stock comprises a state of one or more systems aboard the rolling stock and/or one or more components aboard the rolling stock.

18. The device according to claim 17, wherein said one or more systems and/or said one or more components comprises temperature sensors, pressure sensors, brakes, doors, fire detectors, motors, bearing systems, control systems, air conditioning systems, heating systems, traction motors, power converters, batteries, pantographs, diesel engines, cooling system, and/or navigation systems.

* * * * *